United States Patent
Ito

(10) Patent No.: US 10,397,466 B2
(45) Date of Patent: Aug. 27, 2019

(54) FOCUS ADJUSTMENT DEVICE, FOCUS ADJUSTMENT METHOD, AND NON-TRANSITORY STORAGE MEDIUM FOR STORING FOCUS ADJUSTMENT PROGRAMS

(71) Applicant: Olympus Corporation, Hachioji-shi, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 73 days.

(21) Appl. No.: 15/823,240

(22) Filed: Nov. 27, 2017

(65) Prior Publication Data

US 2018/0152620 A1  May 31, 2018

(30) Foreign Application Priority Data

Nov. 28, 2016 (JP) .................................. 2016-230165

(51) Int. Cl.
| | |
|---|---|
| *H04N 5/232* | (2006.01) |
| *G02B 7/36* | (2006.01) |
| *G03B 13/36* | (2006.01) |
| *G02B 7/34* | (2006.01) |

(52) U.S. Cl.
CPC ........... *H04N 5/23212* (2013.01); *G02B 7/34* (2013.01); *G02B 7/36* (2013.01); *G03B 13/36* (2013.01); *H04N 5/232* (2013.01); *H04N 5/23209* (2013.01); *H04N 5/23293* (2013.01)

(58) Field of Classification Search
CPC combination set(s) only.
See application file for complete search history.

(56) References Cited

U.S. PATENT DOCUMENTS

| | | | |
|---|---|---|---|
| 7,822,334 B2 | 10/2010 | Ono | |
| 10,027,880 B2* | 7/2018 | Ito | ............................ G02B 7/09 |
| 2012/0242886 A1* | 9/2012 | Kawarada | .............. G02B 7/365 |
| | | | 348/345 |
| 2016/0277668 A1* | 9/2016 | Yokozeki | ................. G02B 7/34 |

* cited by examiner

*Primary Examiner* — Twyler L Haskins
*Assistant Examiner* — Angel L Garces-Rivera
(74) *Attorney, Agent, or Firm* — John C. Pokotylo; Pokotylo Patent Services

(57) ABSTRACT

An extreme value detection section performs a scan operation to detect and store an extreme value of a contrast and a direction of change in the contrast while performing scan driving of a focus lens, based on a direction indicated by a defocus amount. A determination start position calculation section calculates a determination start position corresponding to a position of the focus lens where a determination whether the scan operation is stopped is started, as a position precedent to an in-focus position based on the defocus amount. A control section stops the scan operation if a maximum value is detected during the scan operation before the focus lens reaches the determination start position and it is determined that the contrast decreases as a latest change during the scan operation after the focus lens reaches the determination start position.

16 Claims, 12 Drawing Sheets

FOCUS ADJUSTMENT DEVICE, FOCUS ADJUSTMENT METHOD, AND NON-TRANSITORY STORAGE MEDIUM FOR STORING FOCUS ADJUSTMENT PROGRAMS

CROSS-REFERENCE TO RELATED APPLICATION

This application is based upon and claims the benefit of priority from prior Japanese Patent Application No. 2016-230165, filed on Nov. 28, 2016, the entire contents of which are incorporated herein by reference.

BACKGROUND OF THE INVENTION

1. Field of the Invention

The present invention relates to a focus adjustment device for adjusting a focus of a focus lens of, for example, an image pickup apparatus, a focus adjustment method for doing the same, and a non-transitory storage medium for storing focus adjustment programs.

2. Description of the Related Art

Optical Instruments such as image pickup apparatuses have an automatic focus adjustment function (what is called an autofocus (AF) function) to adjust a focus automatically. The AF function includes various types of systems. For example, a phase difference AF system is known in which focusing is performed by the pupil division type imaging plane phase difference detection system on the basis of a signal output from a focus detecting pixel row formed in, for example, an image pickup device. A contrast AF system is also widely used in which focusing based on a contrast detection system is performed based on output signals from pixels for image pickup provided in an image pickup device. An image pickup apparatus referred to as a hybrid AF system is also known which adopts a plurality of AF systems, for example, both a phase difference AF system and a contrast AF system.

For example, U.S. Pat. No. 7,822,334 proposes a focus adjustment method in which scan driving of a focus lens is performed when a position corresponding to the addition of an offset to an in-focus position detected by the phase difference AF system is set as a stop target position, and a contrast peak detected during the scan driving is set as an in-focus position. The focus adjustment method of the U.S. patent makes it possible to perform high-speed, high-accuracy focus detection with stability.

BRIEF SUMMARY OF THE INVENTION

According to a first aspect of the present invention, there is provided a focus adjustment device including an image pickup device which receives object light via an image-acquiring lens including a focus lens and generates image pickup signals, the focus adjustment device allowing a defocus amount to be detected by a phase difference detection system based on the image pickup signals and allowing contrast to be detected by a contrast detection system based on the image pickup signals, the focus adjustment device comprising: an extreme value detection section configured to acquire the contrast repeatedly while performing scan driving of the focus lens, based on a direction indicated by the defocus amount detected by the phase difference detection system, and perform a scan operation to detect and store an extreme value of the contrast and a direction of change in the contrast; a determination start position calculation section configured to calculate a determination start position corresponding to a position of the focus lens where a determination whether the scan operation is stopped is started, as a position precedent to an in-focus position based on the defocus amount; and a control section configured to stop the scan operation if the extreme value detection section detects a maximum value during the scan operation before the focus lens reaches the determination start position calculated by the determination start position calculation section and the control section determines that the contrast decreases as a latest change during the scan operation after the focus lens reaches the determination start position.

According to a second aspect of the present invention, there is provided a focus adjustment method for performing a focus adjustment operation by causing an image pickup device to receive object light via an image-acquiring lens including a focus lens and generate image pickup signals, detecting a defocus amount by a phase difference detection system based on the image pickup signals, and detecting contrast by a contrast detection system based on the image pickup signals, the method comprising: acquiring the contrast repeatedly while performing scan driving of the focus lens, based on a direction indicated by the defocus amount detected by the phase difference detection system, and performing a scan operation to detect and store an extreme value of the contrast and a direction of change in the contrast; calculating a determination start position corresponding to a position of the focus lens where a determination whether the scan operation is stopped is started, as a position precedent to an in-focus position based on the defocus amount; stopping the scan operation if a maximum value is detected during the scan operation before the focus lens reaches the determination start position and it is determined that the contrast decreases as a latest change during the scan operation after the focus lens reaches the determination start position; and driving the focus lens to a position of the focus lens, corresponding to the maximum value detected during the scan operation before the focus lens reaches the determination start position.

According to a third aspect of the present invention, there is provided a non-transitory storage medium for storing computer-readable focus adjustment programs which are executed by a computer which performs focus adjustment operation by causing an image pickup device to receive object light via an image-acquiring lens including a focus lens and generate image pickup signals, detecting a defocus amount by a phase difference detection system based on the image pickup signals, and detecting contrast by a contrast detection system based on the image pickup signals, when the focus adjust programs are executed by the computer, the focus adjust programs causing the computer to: acquire the contrast repeatedly while performing scan driving of the focus lens, based on a direction indicated by the defocus amount detected by the phase difference detection system, and perform a scan operation to detect and store an extreme value of the contrast and a direction of change in the contrast; calculate a determination start position corresponding to a position of the focus lens where a determination whether the scan operation is stopped is started, as a position precedent to an in-focus position based on the defocus amount; stop the scan operation if a maximum value is detected during the scan operation before the focus lens reaches the determination start position and it is determined that the contrast decreases as a latest change during the scan operation after the focus lens reaches the determination start position; and drive the focus lens to a position of the focus lens, corresponding to the maximum value detected during the scan operation before the focus lens reaches the determination start position.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
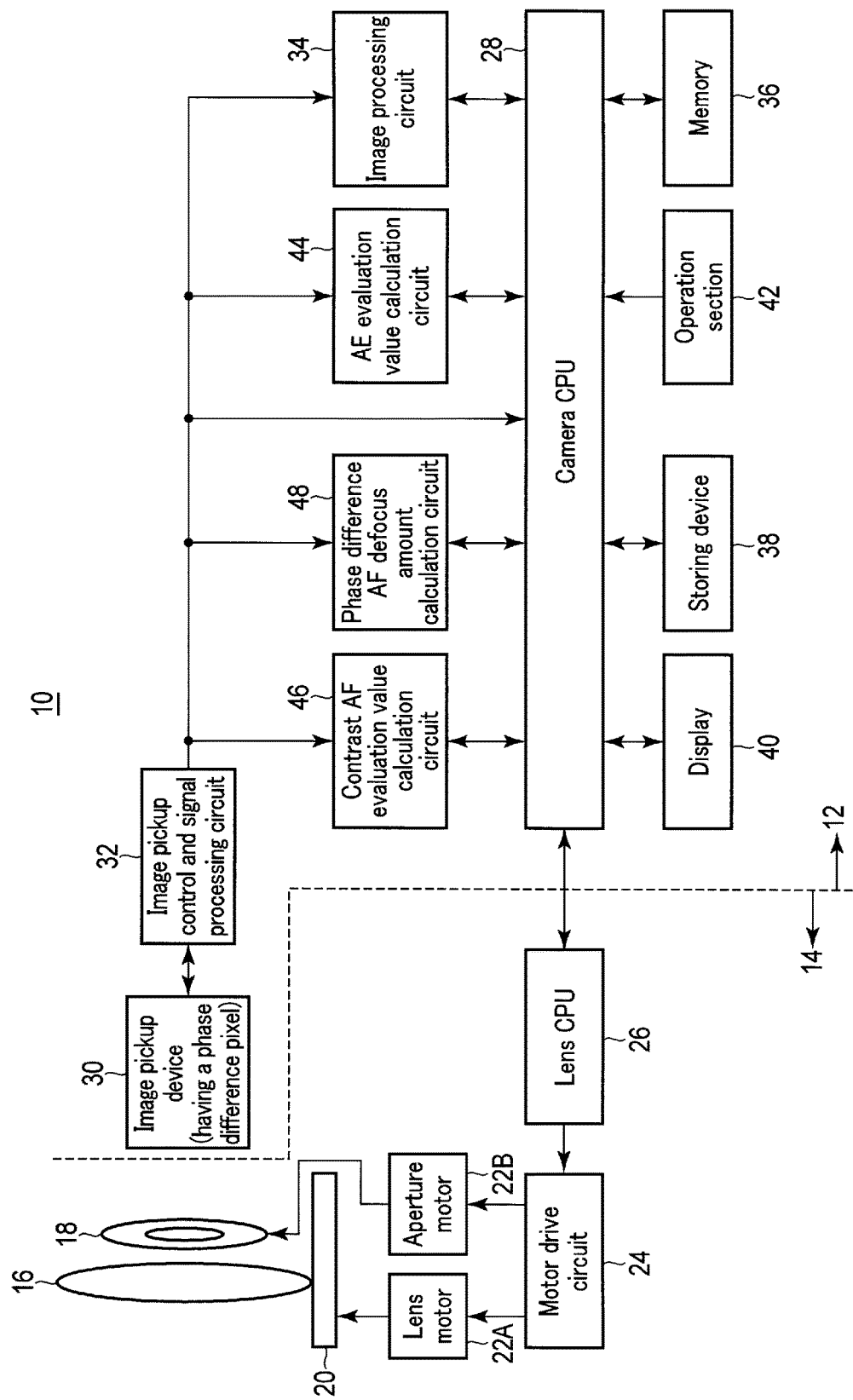
FIG. 1 is a block diagram of an image pickup apparatus to which a focus adjustment device according to an embodiment of the present invention is applied.

As shown in FIG. 1, the image pickup apparatus 10 to which the focus adjustment device according to the embodiment of the present invention is applied, includes a body unit 12 and an interchangeable lens unit (or a lens barrel) 14 as an accessory device. The embodiment is directed to the lens-interchangeable image pickup apparatus 10; however, the focus adjustment device according to the embodiment can also be applied to a lens-integrated image pickup apparatus, such as a generally-used compact camera that precludes a lens from being removed from the camera main body.

The lens unit 14 can be removably installed in the body unit 12 via a lens mount provided on a front surface of the body unit 12 and not depicted in the drawings. The lens unit 14 comprises an image-acquiring optical system 16, an aperture 18, a lens frame 20, a lens motor 22A, an aperture motor 22B, a motor drive circuit 24, and a lens CPU 26.

The image-acquiring optical system 16 is supported by the lens frame 20. The lens motor 22A moves the lens frame 20 in order to move the image-acquiring optical system 16 along the direction of an optical axis direction. The aperture motor 22B opens and closes the aperture 18 in order to adjust the opening of the aperture 18. The lens motor 22A and the aperture motor 22B are driven via the motor drive circuit 24 in accordance with control signals from the lens CPU 26.

The lens CPU 26 controllably drives sections in the lens unit 14 such as the lens motor 22A and the aperture motor 22B. The lens CPU 26 is connected to a camera CPU 28 provided in the body unit 12, via a communication connector not depicted in the drawings, and is controlled in accordance with instructions from the camera CPU 28. That is, the camera CPU 28 and the lens CPU 26 are electrically connected together via the communication connector so as to be able to communicate with each other when the lens unit 14 is installed in the body unit 12. The lens CPU 26 operates while cooperating dependently with the camera CPU 28.

On the other hand, the body unit 12 comprises, on an optical axis of the image-acquiring lens 16 in the lens unit 14, an image pickup device 30 configured to photoelectrically convert an object image having passed through the image-acquiring lens 16. That is, a luminous flux having passed through the image-acquiring lens 16 and the aperture 18 is formed into an image on an image pickup surface of the image pickup device 30. The image pickup device 30 is configured to be able to control exposure using an electronic shutter (for example, an electronic rolling shutter). Examples of the image pickup device 30 include a CMOS sensor and a CCD sensor. The electric rolling shutter refers to a shutter that performs resetting or signal reading on a plurality of pixels two-dimensionally arranged on the image pickup surface of the image pickup device 30 such that the resetting or signal reading is executed on each of the pixels in time series order or in units of lines. That is, the image pickup device 30 can accomplish functions similar to the functions of a mechanical shutter by electronically controlling signal accumulation time for each pixel or each line. Although not depicted in the drawings, the image pickup device 30 has phase difference pixels that allow focusing based on a pupil division phase difference system.

The body unit 12 is provided with an image pickup control and signal processing circuit 32 connected to the image pickup device 30. The image pickup control and signal processing circuit 32 is connected to the camera CPU 28 to control the electronic shutter of the image pickup device 30 in accordance with instructions from the camera CPU 28.

The camera CPU 28 further connects to an image processing circuit 34, a memory 36, a storing device 38, a display 40, an operation section 42, an AE evaluation value calculation circuit 44, a contrast AF evaluation value calculation circuit 46, and a phase difference AF defocus amount calculation circuit 48.

The image pickup control and signal processing circuit 32 is connected to the image processing circuit 34 configured for image processing. The body unit 12 is configured to be able to provide an electronic image pickup function using the camera CPU 28, the image pickup device 30, the image pickup control and signal processing circuit 32, the image processing circuit 34, the memory 36, and the storing device 38.

The image processing circuit 34 loads image pickup signals output by the image pickup device 30, via the image pickup control and signal processing circuit 32 in accordance with instructions from the camera CPU 28. Each of the image pickup signals is converted into a video signal by the image processing circuit 34, and the video signal is output to the display 40 via the camera CPU 28 so that the display 40 can provide display. A photographer can check an acquired image via a displayed image on the display 40.

The memory 36 provided as a storage area includes, for example, an SDRAM and a flash ROM. In this case, the SDRAM is a memory for temporary storage of image pickup signals and is used as a work area or the like when an image pickup signal is converted. The image pickup device is subjected to various types of image processing and thus converted into a JPEG data, which is stored in the storing device 38. The storing device 38 is an external storage medium such as any of various memory cards or an external hard disc drive (HDD). The storing device 38 is installed in the body unit 12 of the image pickup apparatus 10 so as to be able to communicate with the body unit 12 and to be replaceable. The flash ROM stores in a nonvolatile manner control programs to be executed by the camera CPU 24. The control programs include the focus adjustment programs according to the embodiment of the present invention. Thus, the flash ROM can serve as a non-transitory storage medium for storing the focus adjustment programs. The SDRAM is also used as a buffer for temporarily storing data such as control parameters and mode setting values which are referenced or rewritten during execution of the control programs.

Although not depicted in the drawings, the operation section 42 includes a switch group including operation buttons needed to operate the image pickup apparatus 10, for example, a release switch that gives an instruction to perform an image acquisition operation, a mode change switch that switches between an image acquisition mode and an image display mode, and a power switch. The release switch involves a half press operation for a release button, that is, a first release depressing operation, and a second release depressing operation that is a full press operation for the release button.

The AE evaluation value calculation circuit 44 calculates an AE (Automatic Exposure) evaluation value from the image pickup signals output by the image pickup device 30. The camera CPU 28 sets an exposure state (a shutter speed and an f-number) based on the AE evaluation value calculated by the AE evaluation value calculation circuit 44. Information indicative of the f-number is sent from the camera CPU 28 to the lens CPU 26, which controls the opening of the aperture 18 in accordance with the information.

The contrast AF evaluation value calculation circuit 46 loads the image pickup signals output by the image pickup device 30 via the image pickup control and signal processing circuit 32, and calculates the AF evaluation value, which is indicative of contrast, based on the image pickup signals. The camera CPU 28 determines a lens position where the camera is focused using a focus lens provided in the image-acquiring lens 16, based on the AF evaluation value calculated by the contrast AF evaluation value calculation circuit 46.

The phase difference AF defocus amount calculation circuit 48 loads, via the image pickup control and signal processing circuit 32, signals from phase difference pixels provided in the image pickup device 30, and performs focus detection based on phase difference detection to output a defocus amount of the image-acquiring lens 16. Based on the defocus amount output by the phase difference AF defocus amount calculation circuit 48, the camera CPU 28 determines a lens position where the camera is focused using a focus lens provided in the image-acquiring lens 16. Instead of the phase difference pixels provided in the image pickup device 30, a dedicated sensor may be provided so that the phase difference can be calculated using signals from the sensor.

In the image pickup apparatus 10 configured as described above, a luminous flux incident through the image-acquiring lens 16 is guided to the image pickup device 30 via the aperture 18. The image pickup device 3 generates image pickup signals. The image processing circuit 34 controls the image pickup control and signal processing circuit 32 in accordance with instructions from the camera CPU 28, and causes the image pickup control and signal processing circuit 32 to load the image pickup signals from the image pickup device 30. The image pickup signals loaded are stored via the camera CPU 28 into the memory 36, which is a memory for temporary storage. The image pickup signals stored in the memory 36 are read by the image processing circuit 34 via the camera CPU 28. The image processing circuit 34 converts the read image pickup signals into a video signals and outputs the video signals to the display 40 via the camera CPU 28 so that the display 40 can provide display. Consequently, the photographer can check the acquired image in the displayed image on the display 40, that is, what is called a live view image.

The focusing with the focus lens provided in the image-acquiring optical system 16 is performed as follows. That is, scan driving is executed to sequentially vary the position of the focus lens, and images are sequentially acquired. Prior to the start of the scan driving, the camera CPU 28 sets a determination start position of the focus lens to determine whether the scan driving should be stopped or not, on the basis of a defocus amount output from the phase difference AF defocus amount calculation circuit 48. The camera CPU 28 calculates a lens position in which the contrast of the acquired image is the highest, on the basis of the AF evaluation values calculated by the contrast AF evaluation calculation circuit 46 during the scan driving. The calculated lens position is transmitted from the camera CPU 28 to the lens CPU 26 in the body unit 12, and the lens CPU 26 controllably shifts the focus lens in the image-acquiring lens 16 to the lens position.

The foregoing contrast AF evaluation calculation circuit 46, phase difference AF defocus amount calculation circuit 48 and camera CPU 28 serve as a focus adjustment device.

The AE evaluation value calculation circuit 44 has a function to detect the amount of light (AE evaluation value) in the image pickup signals output by the image pickup device 30 to execute a well-known photometry process based on the amount of light.

During image acquisition, upon receiving, from the camera CPU 28, a signal allowing the shutter to be controllably driven, the image pickup control and signal processing circuit 32 controls the electronic shutter based on the signal. The image processing circuit 34 loads the image pickup signals from the image pickup device 30 into the memory 36 in accordance with the instruction from the camera CPU 28 as described above. Subsequently, the image processing circuit 34 executes various types of image processing on the image pickup signals loaded in the memory 36, converts the resultant signals into JPEG data, and stores the JPEG data in the storing device 38. When the image pickup signals are a moving image, the image processing circuit 34 converts the signals into MPEG data or the like and then stores the resultant data in the storing device 38.

When the photographer operates the mode change switch in the operation section 42 to switch from the image acquisition mode to the image display mode, the image pickup signals stored in the storing device 38 are read and can be displayed on the display 40. That is, the image processing circuit 34 reads the image pickup signals read from the storing device 38, converts the image pickup signals read into video signals, and outputs the video signals to the display 40 via the camera CPU 28 so that the display 40 can provide display.

Figure 2:
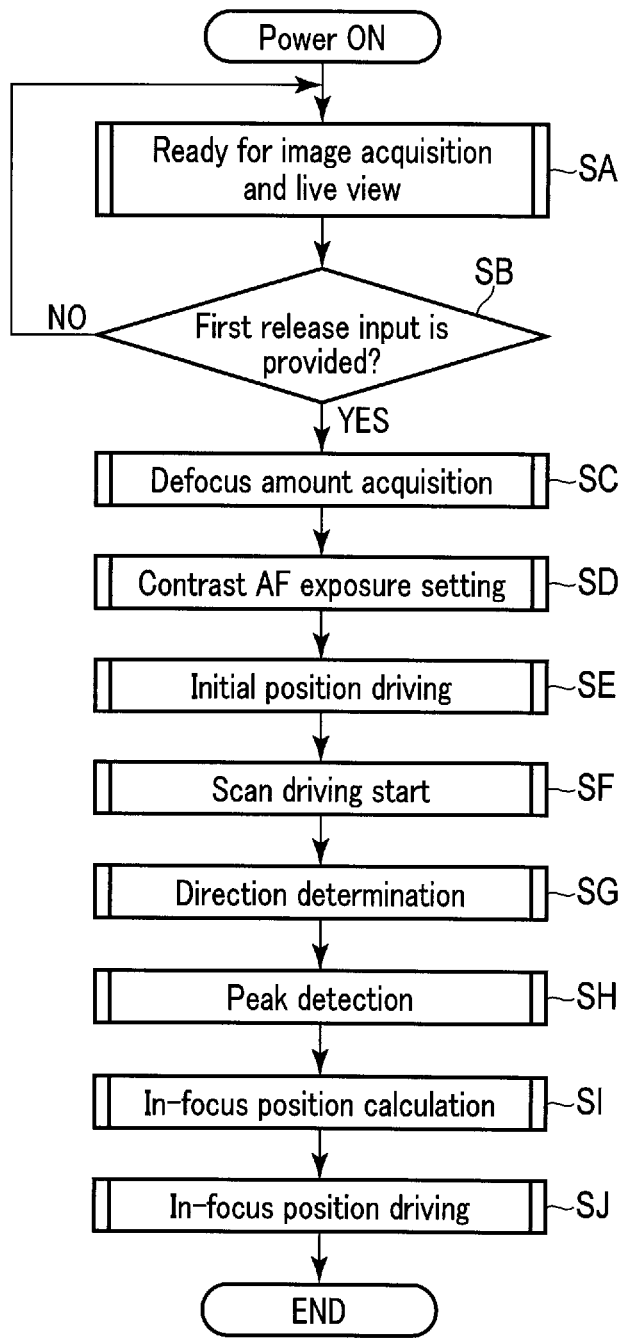
FIG. 2 is a flowchart for focus adjustment programs according to the embodiment of the present invention.

An AF operation in the image pickup apparatus 10 configured as described above will be described in detail below with reference to a flowchart illustrated in FIG. 2. In the AF operation, the camera CPU 28, which is a computer that performs focus adjustment in response to image signals of the image pickup device including focus detection pixels, executes focus adjustment programs according to one embodiment of the present invention, which are stored in a non-transitory storage medium, such as a flash ROM as described above.

First, when the photographer operates the power switch in the operation section 42 to turn on a body power supply, the camera CPU 28 performs a predetermined initialization operation, gets ready for image acquisition, and allows the display 40 to provide live view display (step SA).

Subsequently, the camera CPU 28 determines whether or not the photographer has half pressed the release switch in the operation section 42, that is, whether or not the photographer has provided a first release input based on the first release depression (step SB). Upon determining that the first release input has not been provided, the camera CPU 28 returns the process to step SA described above. Whether or not the first release input has been provided is periodically determined (for example, at every certain frame rate for image pickup). The camera CPU 28 also periodically communicates with the lens CPU 26 to acquire various types of information such as position information on the focus lens.

In contrast, upon determining that the first release input has been provided, the camera CPU 28 performs a defocus amount acquisition subroutine (step SC). In this subroutine, the camera CPU 28 causes the phase difference AF defocus amount calculation circuit 48 to calculate a defocus amount and sets, e.g. a determination start position that is a position of the focus lens where the camera CPU 28 starts to determine whether the scan operation is stopped or not, based on the defocus amount. The defocus amount acquisition subroutine will be described in detail later. After that, the camera CPU 28 performs a contrast AF exposure setting subroutine (step SD). In this subroutine, the camera CPU 28 causes the AE evaluation value calculation circuit 44 to perform a well-known photometry process and sets the image pickup apparatus 10 in an exposure state for contrast AF on the basis of a result of the photometry process. In other words, the camera CPU 28 sets a shutter speed in the image pickup control and signal processing circuit 32 and sets an aperture value in the aperture 18 via the motor drive circuit 24 and the aperture motor 22B. More specifically, the aperture 18 is set based on a control command that is transmitted to the lens CPU 26 from the camera CPU 28.

Upon setting, e.g. the determination start position and the exposure for contrast AF, the camera CPU 28 performs an initial position driving subroutine (step SE). In this subroutine, the camera CPU 28 executes the initial position driving of the focus lens when necessary on the basis of the defocus amount output from the phase difference AF defocus amount calculation circuit 48.

The camera CPU 28 performs a scan driving start subroutine (step SF). In this subroutine, the camera CPU 28 causes the contrast AF evaluation calculation circuit 46 to start to acquire an AF evaluation value, and drives the motor drive circuit 24 and the lens motor 22A to start to move the focus lens of the image-acquiring lens 16. Note that the lens driving of the focus lens is controlled based upon a control command that is transmitted to the lens CPU 26 from the camera CPU 28. The scan driving start subroutine will be described in detail later.

The camera CPU 28 performs a direction determination subroutine (step SG). In this subroutine, the camera CPU 28 determines a direction to be scan-driven the focus lens. The direction determination subroutine will be described in detail later.

The camera CPU 28 performs a peak detection subroutine (step SH). In this subroutine, the camera CPU 28 detects peaks (maximum values) of the AF evaluation value, which is obtained by the contrast AF evaluation calculation circuit 46, from the variations in the AF evaluation values. The peak detection subroutine will be described in detail later.

Upon detecting a peak of the AF evaluation value, the camera CPU 28 performs an in-focus position calculation subroutine to calculate an in-focus and calculate a pulse amount to move the focus lens to the in-focus position (step SI). After that, the camera CPU 28 performs an in-focus position driving subroutine to drive the focus lens by the calculated pulse amount (step SJ).

Subsequently, although not depicted in the drawings, the camera CPU 28, in accordance with a second release input that is the full press operation of the release switch, performs an exposure operation, executes various types of image processing on the image pickup signal from the image pickup device 30, and stores the resultant signal in the storing device 38.

Figure 3:
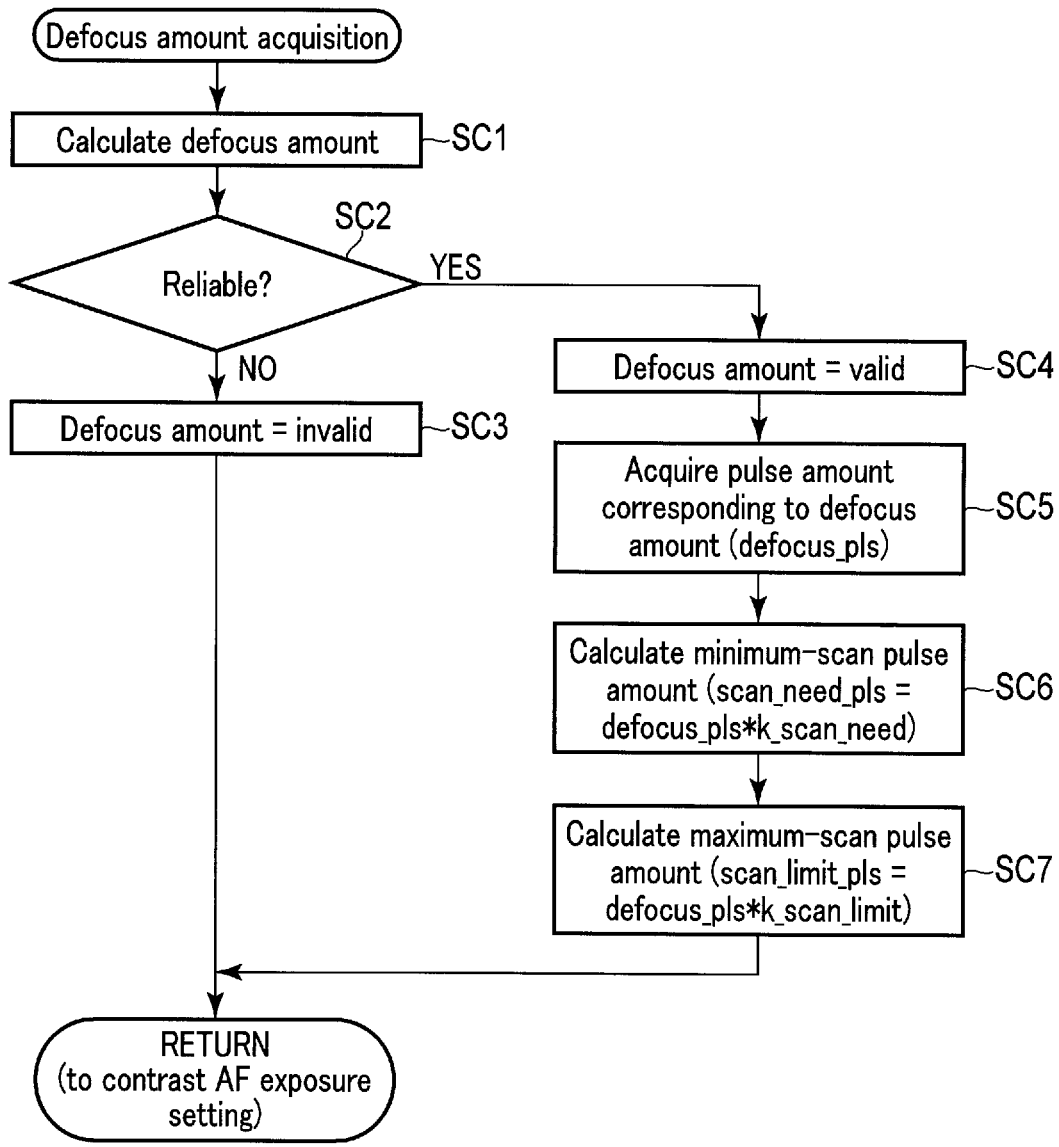
FIG. 3 is a flowchart illustrating a process of a defocus amount acquisition subroutine in FIG. 2.

The defocus amount acquisition subroutine to be performed in step SC will be described in detail below with reference to the flowchart shown in FIG. 3.

In the defocus amount acquisition subroutine, first, the camera CPU 28 causes the phase difference AF defocus amount calculation circuit 48 to calculate a defocus amount (step SC1). Then, the camera CPU 28 determines whether the calculated defocus amount is reliable or not (step SC2).

Upon determining that the calculated defocus amount is not reliable, the camera CPU 28 sets "invalid" in a "defocus amount" flag set inside the camera CPU 28 or in the memory 36 (step SC3). After that, the camera CPU 28 ends the defocus amount acquisition subroutine and advances to the contrast AF exposure setting subroutine in step SD.

In contrast, upon determining that the calculated defocus amount is reliable, the camera CPU 28 sets "valid" in the "defocus amount" flag (step SC4). After that, the camera CPU 28 acquires a pulse amount defocus_pls corresponding to the defocus amount calculated by the phase difference AF defocus amount calculation circuit 48, and stores it temporarily in a buffer that is configured in the memory 36 (step SC5). In other words, the camera CPU 28 acquires a driving pulse amount of the lens motor 22A, which is needed to move the focus lens from the current position (pos_ini) of the focus lens to a position corresponding to the defocus amount (phase difference in-focus position). Note that the acquired pulse amount defocus_pls is stored temporarily in the buffer configured in the memory 36.

The camera CPU 28 calculates a driving pulse amount of the lens motor 22A which is needed to move the focus lens to the minimum-scan position as a determination start position that is a position of the focus lens where the camera CPU 28 starts to determine whether the scan operation should be stopped or not (step SC6). In other words, the camera CPU 28 calculates a minimum-scan pulse amount scan_need_pls to move the focus lens to the minimum-scan position by multiplying the pulse amount defocus_pls corresponding to the defocus amount by a predetermined coefficient k_scan_need. The calculated minimum-scan pulse amount scan_need_pls is stored temporarily in the buffer configured in the memory 36. The coefficient k_scan_need is, for example, 0.8 and is stored in the memory 36 as an appropriate value selected in consideration of a calculation error of the defocus amount.

The camera CPU 28 also calculates a driving pulse amount of the lens motor 22A which is needed to move the focus lens to the maximum-scan position that is a position of the focus lens where the camera CPU 28 ends the scan operation forcibly (step SC7). In other words, the camera CPU 28 calculates a maximum-scan pulse amount scan_limit_pls to the maximum-scan position by multiplying the pulse amount defocus_pls corresponding to the defocus amount by a predetermined coefficient k_scan_limit. The calculated maximum-scan pulse amount scan_limit_pls is stored temporarily in the buffer configured in the memory 36. The coefficient k_scan_limit is, for example, 1.3 and is stored in the memory 36 as an appropriate value selected in consideration of a calculation error of the defocus amount.

Once the camera CPU 28 has acquired the pulse amount defocus_pls corresponding to the defocus amount and calculated the minimum-scan pulse amount scan_need_pls and the maximum-scan pulse amount scan_limit_pls, it ends the defocus amount acquisition subroutine and advances to the contrast AF exposure setting subroutine in step SD.

Figure 4:
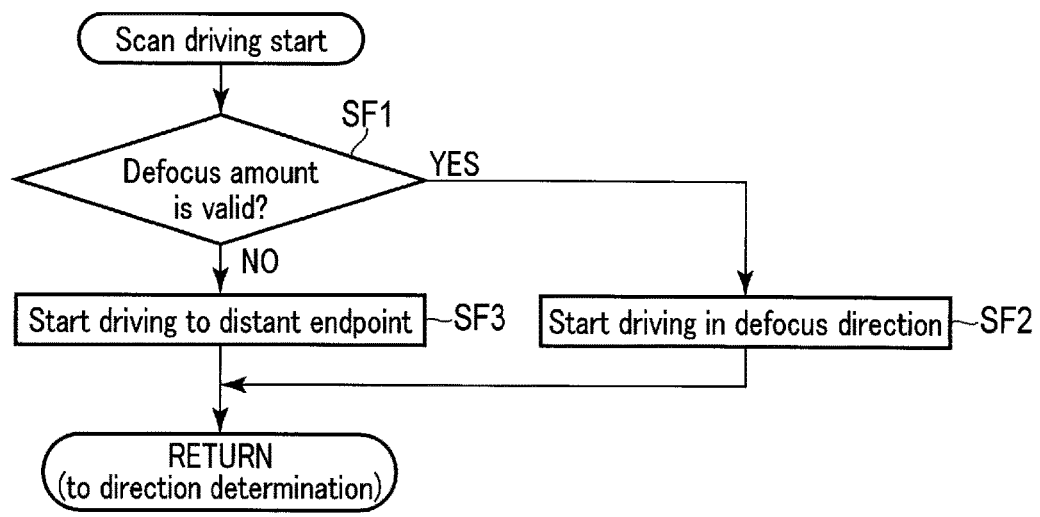
FIG. 4 is a flowchart illustrating a process of a scan driving start subroutine in FIG. 2.

The scan driving start subroutine to be performed in step SF will be described in detail below with reference to the flowchart shown in FIG. 4.

In the scan driving start subroutine, first, the camera CPU 28 determines whether "valid" is set in a "defocus" flag (step SF1).

Upon determining that "valid" is set in the "defocus" flag, the camera CPU 28 transmits a control command to the lens CPU 26 to start scan driving of the focus lens in the defocus direction (step SF2), Then, the camera CPU 28 ends the scan driving start subroutine and advances to the direction determination subroutine in step SG.

In contrast, upon determining that "valid" is not set in the "defocus" flag, the camera CPU 28 transmits a control command to the lens CPU 26 to start scan driving of the focus lens in an endpoint direction distant from the current position of the focus lens (step SF3). Then, the camera CPU 28 ends the scan driving start subroutine and advances to the direction determination subroutine in step SG.

Figure 5:
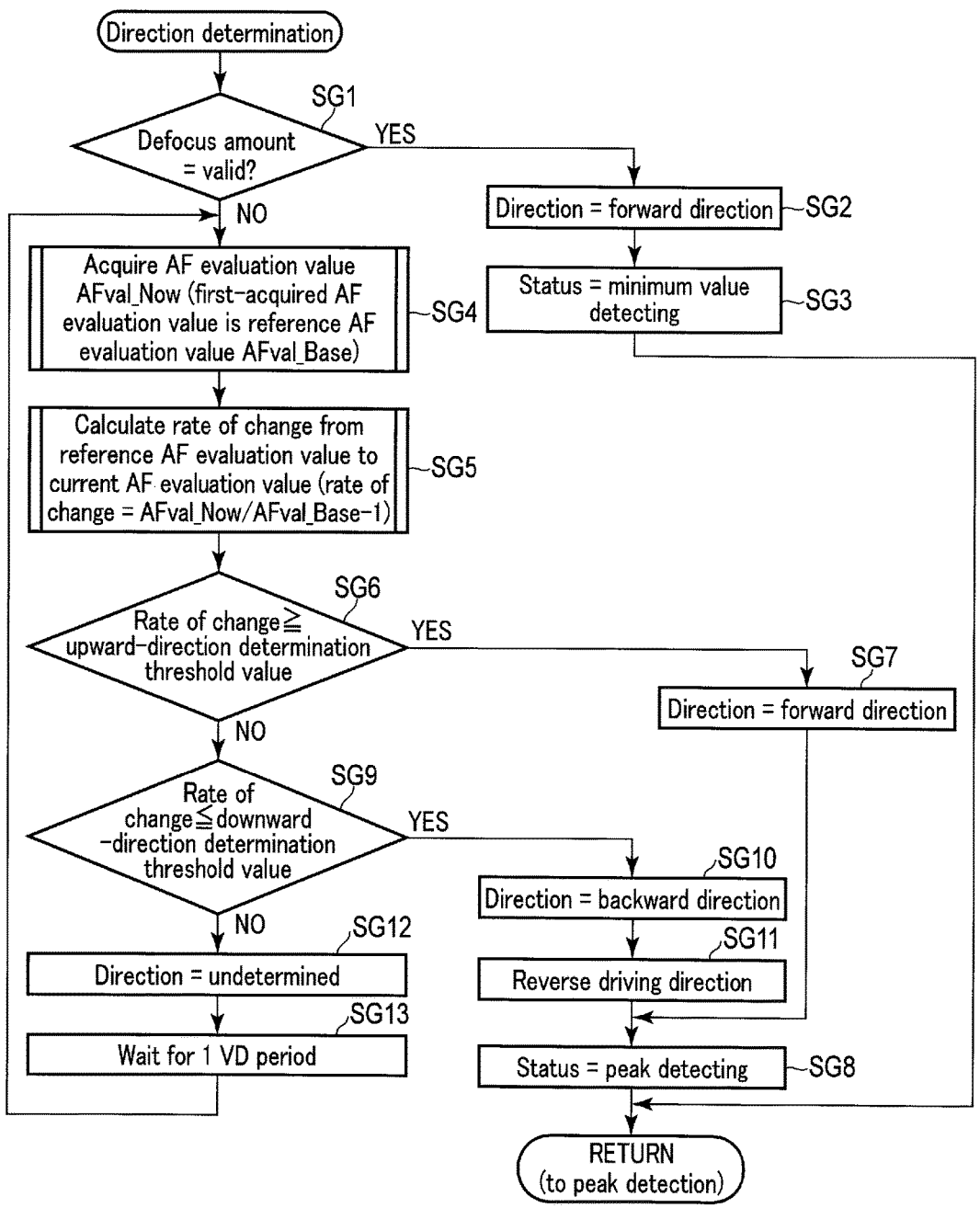
FIG. 5 is a flowchart illustrating a process of a direction determination subroutine in FIG. 2.

The direction determination subroutine to be performed in step SG will be described in detail below with reference to the flowchart shown in FIG. 5.

In the direction determination subroutine, first, the camera CPU 28 determines whether "valid" is set in the "defocus" flag (step SG1).

Upon determining that "valid" is set in the "defocus" flag, the camera CPU 28 sets "forward direction" in a "direction" flag set inside the camera CPU 28 or in the memory 36 (step SG2). The camera CPU 28 sets "minimum value detecting" in a "status" flag set inside the camera CPU 28 or in the memory 36 (step SG3). After that, the camera CPU 28 ends the direction determination subroutine and advances to the peak detection subroutine in step SH.

In contrast, upon determining that "valid" is not set in the "defocus" flag, the camera CPU 28 acquires a current AF evaluation value AFval_Now from the contrast AF evaluation calculation circuit 46 (step SG4). The acquired current AF evaluation value AFval_Now is stored temporarily in the buffer configured in the memory 36. Note that the first-acquired current AF evaluation value AFval_Now is stored in the buffer as a reference AF evaluation value AFval_Base.

The camera CPU 28 calculates a rate of change from the reference AF evaluation value AFval_Base stored in the buffer to the current AF evaluation value AFval_Now stored therein (step SG5). In other words, the camera CPU 28 calculates "AFval_Now/AFval_Base-1" to obtain a rate of change. The rate of change so obtained is stored temporarily in the buffer configured in the memory 36.

The camera CPU 28 determines whether the obtained rate of change is equal to or higher than an upward-direction determination threshold value stored in advance in the memory 36 (step SG6).

Upon determining that the rate of change is equal to or higher than the upward-direction determination threshold value, the camera CPU 28 sets "forward direction" in the "direction" flag (step SG7). The camera CPU 28 also sets "peak detecting" in the "status" flag (step SG8). After that, the camera CPU 28 ends the direction determination subroutine and advances to the peak detection subroutine in step SH.

In contrast, upon determining that the rate of change is not higher than the upward-direction determination threshold value, the camera CPU 28 further determines whether the rate of change is equal to or lower than a downward-direction determination threshold value stored in advance in the memory 36 (step SG9).

Upon determining that the rate of change is equal to or lower than the downward-direction determination threshold value, the camera CPU 28 sets "backward direction" in the "direction" flag (step SG10). Then, the camera CPU 28 transmits a control command to the lens CPU 26 to reverse the scan driving direction of the focus lens (step SG11). After that, the camera CPU 28 advances to step SG8.

Upon determining that the rate of change is not lower than the downward-direction determination threshold value, the camera CPU 28 sets "undetermined" in the "direction" flag (step SG12). After that, the camera CPU 28 waits for a 1 VD period to terminate (step SG13) and returns the process to step SG4.

Figure 6:
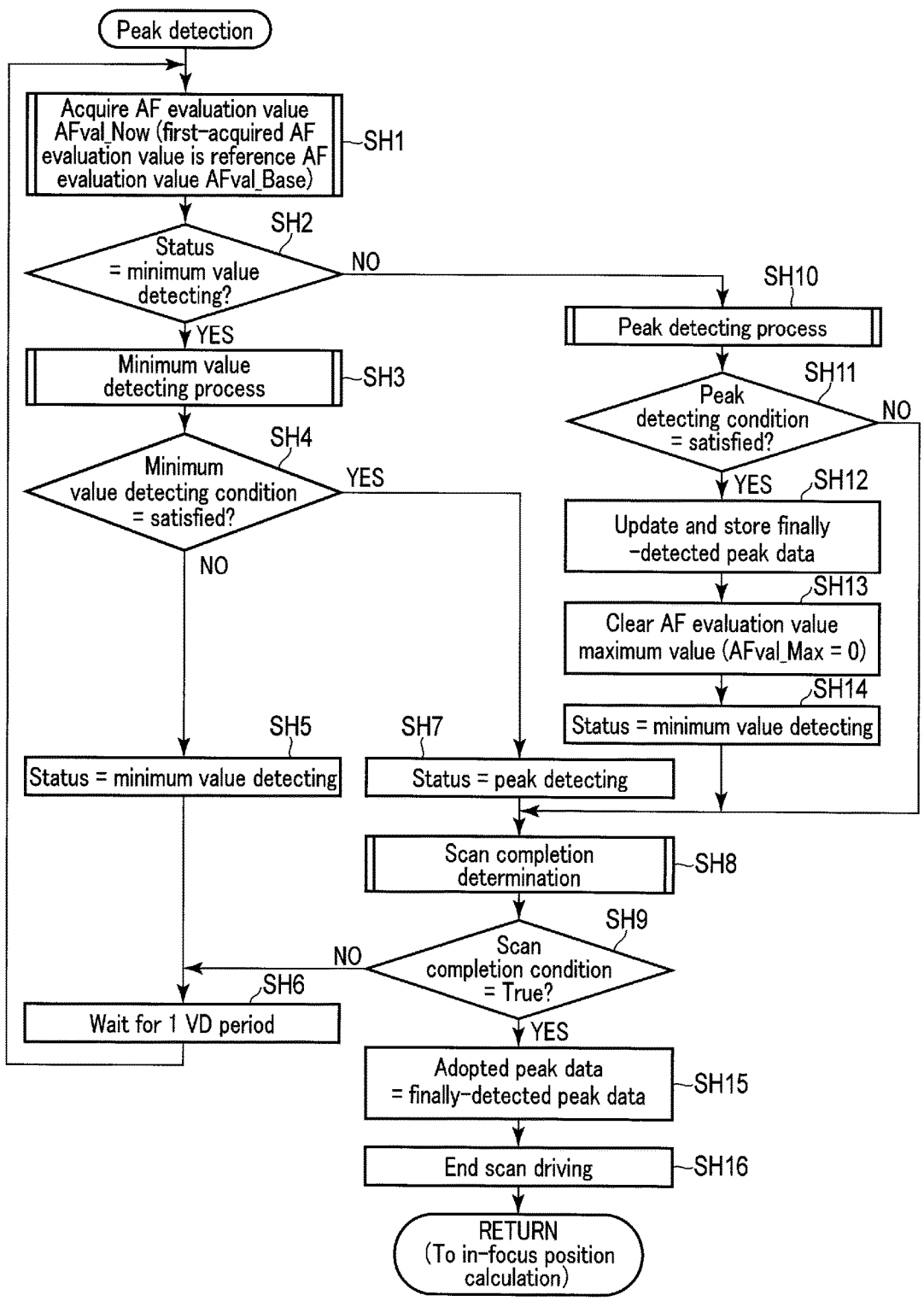
FIG. 6 is a flowchart illustrating a process of a peak detection subroutine in FIG. 2.

The peak detection subroutine to be performed in step SH will be described in detail below with reference to the flowchart shown in FIG. 6.

In the peak detection subroutine, first, the camera CPU 28 acquires a current AF evaluation value AFval_Now from the contrast AF evaluation calculation circuit 46 (step SH1). The acquired current AF evaluation value AFval_Now is stored temporarily in the buffer configured in the memory 36. Note that the first-acquired current AF evaluation value AFval_Now is stored in the buffer as a reference AF evaluation value AFval_Base.

The camera CPU 28 determines whether "minimum value detecting" is set in the "status" flag (step SH2).

Upon determining that "minimum value detecting" is set in the "status" flag, the camera CPU 28 performs a minimum value detecting process subroutine (step SH3). In this subroutine, the camera CPU 28 detects a minimum value of the AF evaluation value. The minimum value detecting process subroutine will be described in detail later. Upon detecting a minimum value in the minimum value detecting process subroutine, the camera CPU 28 sets "satisfied" in a "minimum value detecting condition" flag set inside the camera CPU 28 or in the memory 36. Accordingly, the camera CPU 28 determines whether "satisfied" is set in the "minimum value detecting condition" flag (step SH4).

Upon determining that "satisfied" is not set in the "minimum value detecting condition" flag, the camera CPU 28 sets "minimum value detecting" in the "status" flag (step SH5). After that, the camera CPU 28 waits for a 1 VD period to terminate (step SH6) and returns the process to step SH1.

In contrast, upon determining that "satisfied" is set in the "minimum value detecting condition" flag, the camera CPU 28 sets "peak detecting" in the "status" flag (step SH7). Then, the camera CPU 28 performs a scan completion determination subroutine (step SH8). In this subroutine, the camera CPU 28 determines whether a completion condition of scan driving of the focus lens is satisfied or not. The scan completion determination subroutine will be described in detail later. When the scan completion condition is satisfied in the scan completion determination subroutine, the camera CPU 28 sets "True" in a "scan completion condition" flag set inside the camera CPU 28 or in the memory 36. Accordingly, the camera CPU 28 determines whether "True" is set in a "scan completion condition" flag (step SH9).

Upon determining that "True" is not set in the "scan completion condition" flag, the camera CPU 28 returns the process to step SH6.

In contrast, upon determining in step SH2 that "minimum value detecting" is not set in the "status" flag, the camera CPU 28 performs a peak detecting process subroutine (step SH10). In this subroutine, the camera CPU 28 determines whether the peak of the AF evaluation value is detected or not. The peak detecting process subroutine will be described in detail later. When the peak of the AF evaluation value is detected in the peak detecting process subroutine, the camera CPU 28 sets "satisfied" in a "peak detection condition" flag set inside the camera CPU 28 or in the memory 36. Accordingly, the camera CPU 28 determines whether "satisfied" is set in the "peak detection condition" flag (step SH11).

Upon determining that "satisfied" is not set in the "peak detection condition" flag, the camera CPU 28 returns the process to step SH8.

In contrast, upon determining that "satisfied" is set in the "peak detection condition" flag, the camera CPU 28 updates an AF evaluation value maximum value AFval_Max, which is the detected maximum value of the AF evaluation value that is updated and stored in the buffer configured in the memory 36, during the peak detecting process subroutine, and stores the updated maximum value in the memory 36 as finally-detected peak data (step SH12). The camera CPU 28 clears the AF evaluation value maximum value AFval_Max stored in the buffer of the memory 36 to zero (step SH13). Then, the camera CPU 28 sets "minimum value detecting" in the "status" flag (step SH14). After that, the camera CPU 28 returns the process to step SH8.

Upon determining in step SH9 that "True" is set in the "scan completion condition" flag, the camera CPU 28 sets the finally-detected peak data, which is updated and stored in the memory 36, as adopted peak data for in-focus position calculation, and stores it temporarily in the memory 36 (step SH15). The camera CPU 28 transmits a control command to the lens CPU 26 to end the scan driving of the focus lens (step SH16). After that, the camera CPU 28 ends the process of the peak detection subroutine and advances to the in-focus position calculation subroutine in step SI.

In the in-focus position calculation subroutine in step SI, the camera CPU 28 calculates an in-focus position on the basis of the adopted peak data stored temporarily in the memory 36. In the next in-focus position driving subroutine in step SJ, the camera CPU 28 drives the focus lens in the calculated in-focus position.

Figure 7:
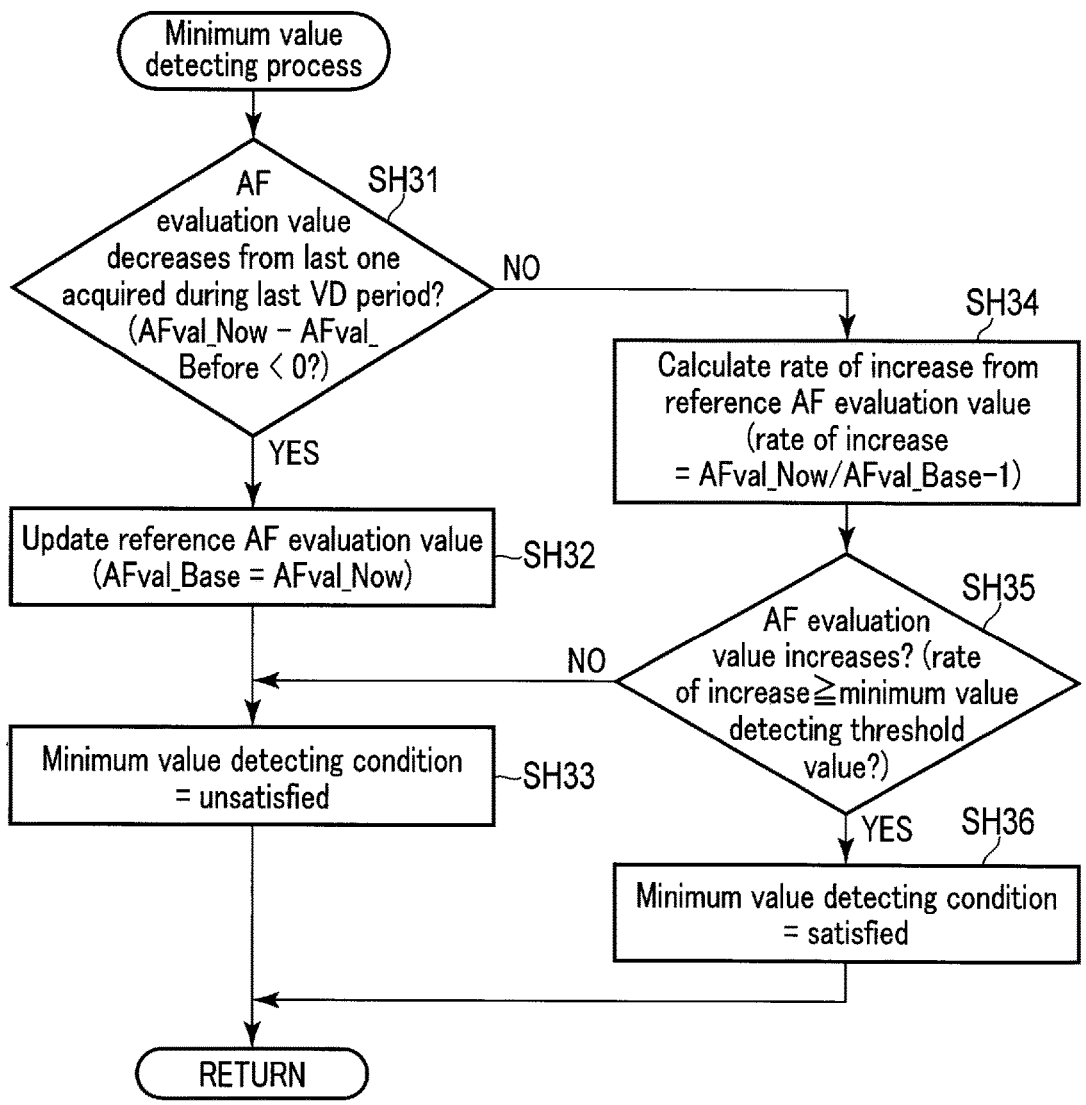
FIG. 7 is a flowchart illustrating a process of a minimum value detecting process subroutine in FIG. 6.

The minimum value detecting process subroutine to be performed in step SH3 during the peak detection subroutine in step SH will be described in detail below with reference to the flowchart shown in FIG. 7.

In the minimum value detecting process subroutine, the camera CPU 28 first determines whether the current AF evaluation value AFval_Now acquired in step SH1 decreases from the last AF evaluation value AFval_Before acquired during the last VD period (step SH31). More specifically, the camera CPU 28 reads the current AF evaluation value AFval_Now and the last AF evaluation value AFval_Before, which are stored temporarily in the buffer configured in the memory 36, and calculates a difference AFval_Now−AFval_Before. The camera CPU 28 then determines whether the difference is smaller than 0 or not. Note that the reference AF evaluation value AFval_Base stored in the buffer configured in the memory 36 is used as the initial value of the last AF evaluation value AFval_Before.

Upon determining that the current AF evaluation value AFval_Now decreases from the last AF evaluation value AFval_Before, the camera CPU 28 updates the reference AF evaluation value AFval_Base stored in the buffer to the current AF evaluation value AFval_Now (step SH32). The camera CPU 28 sets "unsatisfied" in the "minimum value detecting condition" flag set inside the camera CPU 28 or in the memory 36 (step SH33). After that, the camera CPU 28 ends the minimum value detecting process subroutine and advances to the determination process in step SH4.

In contrast, upon determining that the current AF evaluation value AFval_Now does not decrease from the last AF evaluation value AFval_Before, the camera CPU 28 calculates the rate of increase from the reference AF evaluation value AFval_Base stored in the buffer to the current AF evaluation value AFval_Now (step SH34). In other words, the camera CPU 28 calculates "AFval_Now/AFval_Base−1" to obtain the rate of increase. The rate of increase so obtained is stored temporarily in the buffer configured in the memory 36.

The camera CPU 28 determines whether the AF evaluation value increases or not (step SH35). This determination is performed by determining whether the obtained rate of increase is equal to or greater than a minimum value detecting threshold value stored in advance in the memory 36.

Note that the camera CPU 28 returns the process to step SH33 when it determines that the AF evaluation value does not increase.

In contrast, upon determining that the AF evaluation value increases, the camera CPU 28 sets "satisfied" in the "minimum value detecting condition" flag (step SH36). After that, the camera CPU 28 ends the minimum value detecting process subroutine and advances to the determination process in step SH4.

As described above, in the minimum value detecting process subroutine, the reference AF evaluation value AFval_Base is updated while the AF evaluation value is decreasing. If the AF evaluation value exceeds the minimum value and then increases, the reference AF evaluation value AFval_Base is held. If the rate of increase calculated based on the reference AF evaluation value AFval_Base and the current AF evaluation value AFval_Now indicates a minimum value detecting threshold value or more, the camera CPU 28 determines that the AF evaluation value reliably increases, namely, the minimum value has been detected. If the minimum value has been so detected, the AF evaluation value increases in accordance with the scan driving. It is thus necessary to perform a peak detection by performing the peak detecting process subroutine in step SH10. Therefore, the camera CPU 28 sets "satisfied" in the "minimum value detecting condition" flag in step SH36. Accordingly, the camera CPU 28 advances the process from step SH4 to step SH7 to set "peak detecting" in the "status" flag, and then advances to the peak detecting process subroutine in step SH10 described above.

Figure 8:
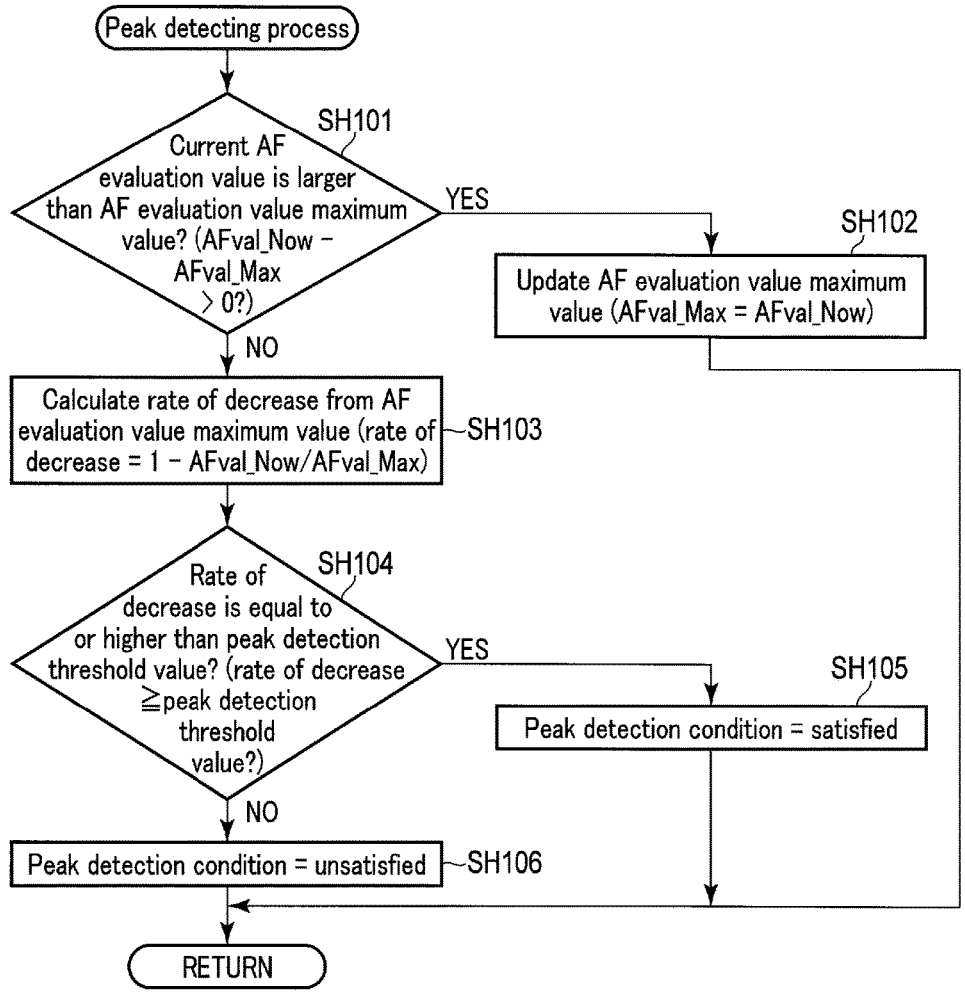
FIG. 8 is a flowchart illustrating a process of a peak detecting process subroutine in FIG. 6.

The peak detecting process subroutine to be performed in step SH10 during the peak detection subroutine in step SH will be described in detail below with reference to the flowchart shown in FIG. 8.

In the peak detecting process subroutine, first, the camera CPU 28 determines whether the current AF evaluation value AFval_Now acquired in step SH1 is larger than the AF evaluation value maximum value AFval_Max (step SH01). More specifically, the camera CPU 28 reads the current AF evaluation value AFval_Now and the AF evaluation value maximum value AFval_Max, which are stored temporarily in the buffer configured in the memory 36, and calculates a difference "AFval_Now−AFval_Max" between them. The camera CPU 28 determines whether a result of the calculation is larger than 0.

Upon determining that the current AF evaluation value AFval_Now is larger than the AF evaluation value maximum value AFval_Max, the camera CPU 28 updates the AF evaluation value maximum value AFval_Max stored in the buffer to the current AF evaluation value AFval_Now (step SH102). Then, the camera CPU 28 ends the peak detecting process subroutine and advances to the determination process in step SH11.

In contrast, upon determining that the current AF evaluation value AFval_Now is not larger than the AF evaluation value maximum value AFval_Max, the camera CPU 28 calculates a rate of decrease from the AF evaluation value maximum value AFval_Max stored in the buffer to the current AF evaluation value AFval_Now (step SH103). In other words, the camera CPU 28 calculates "1−AFval_Now/AFval_Max" to obtain a rate of decrease. The rate of decrease so obtained is stored temporarily in the buffer configured in the memory 36.

The camera CPU 28 determines whether the obtained rate of decrease is equal to or higher than a peak detection threshold value stored in advance in the memory 36 (step SH104).

Upon determining that the rate of decrease is equal to or higher than the peak detection threshold value, the camera CPU 28 sets "satisfied" in the "peak detection condition" flag set inside the camera CPU 28 or in the memory 36 (step SH105). After that, the camera CPU 28 ends the peak detecting process subroutine and advances to the determination process in step SH11.

In contrast, upon determining that the rate of decrease is lower than the peak detection threshold value, the camera CPU 28 sets "unsatisfied" in the "peak detection condition" flag (step SH106). After that, the camera CPU 28 ends the peak detecting process subroutine and advances to the determination process in step SH11.

Figure 9:
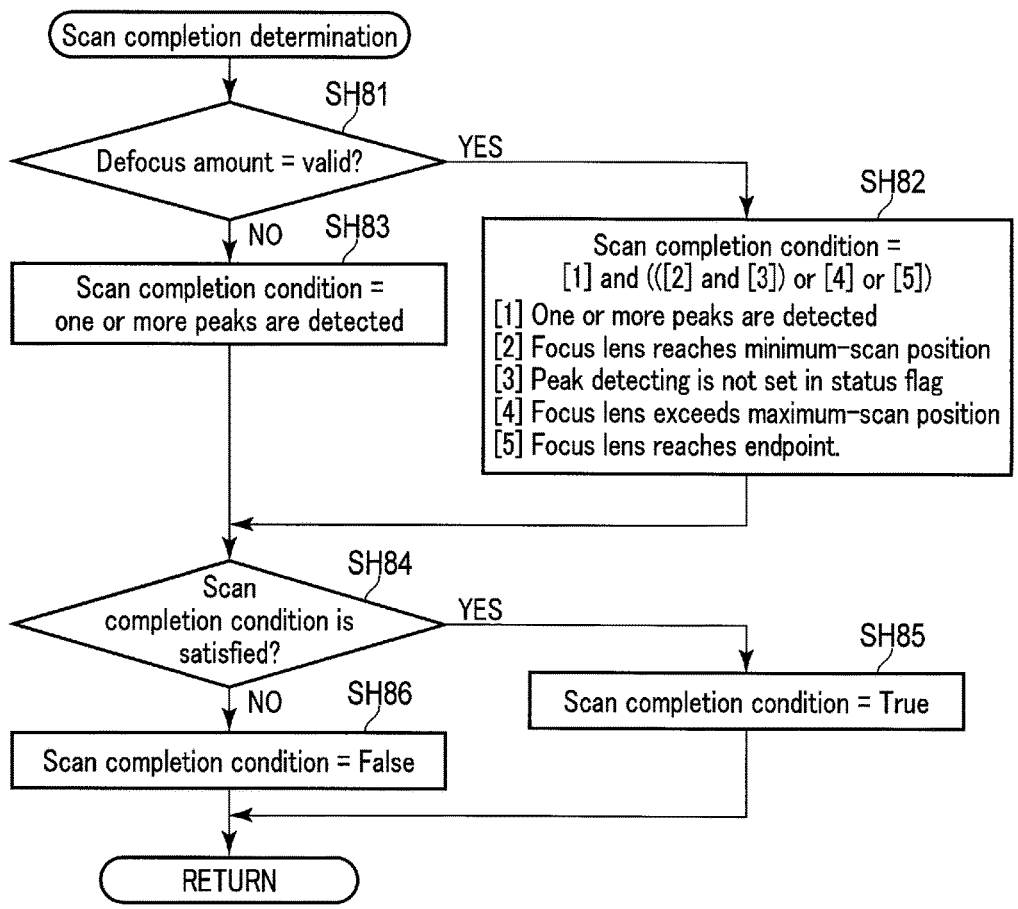
FIG. 9 is a flowchart illustrating a process of a scan completion determination subroutine in FIG. 6.

The scan completion determination subroutine to be performed during the peak detection subroutine in step SH will be described in detail below with reference to the flowchart shown in FIG. 9.

In the scan completion determination subroutine, first, the camera CPU 28 determines whether "valid" is set in the "defocus amount" flag set in inside the camera CPU 28 or in the memory 36 (step SH81).

Upon determining that "valid" is set in the "defocus amount" flag, the camera CPU 28 chooses a combination of the following conditions [1] through [5] as scan completion condition (step SH82):

Condition [1]: One or more peaks are detected;
Condition [2]: The focus lens reaches the minimum-scan position;
Condition [3]: "Peak detecting" is not set in the "status" flag;
Condition [4]: The focus lens exceeds the maximum-scan position; and
Condition [5]: The focus lens reaches the endpoint. Specifically, the camera CPU 28 chooses condition [1] and the combination of conditions [2] and [3] or one of conditions [4] and [5] as the scan completion condition.

In contrast, upon determining that "valid" is not set in the "defocus amount" flag, the camera CPU 28 chooses condition [1] as the scan completion condition (step SH83).

Once the camera CPU 28 has chosen the above scan completion condition, it determines whether the scan completion condition is satisfied or not (step SH84).

Upon determining that the scan completion condition is satisfied, the camera CPU 28 sets "True" in the "scan completion condition" flag set inside the camera CPU 28 or in the memory 36 (step SH85). Then, the camera CPU 28 ends the scan completion determination subroutine and advances to the determination process in step SH9.

In contrast, upon determining that the scan completion condition is not satisfied, the camera CPU 28 sets "False" in the "scan completion condition" flag (step SH86). Then, the camera CPU 28 ends the scan completion determination subroutine and advances to the determination process in step SH9.

AF operations of the image pickup apparatus 10 as described above will be described further based on specific examples.

First, an AF operation in which the scan driving is started in the upward direction of a contrast curve and there are a plurality of peaks (maximum values), will be described with reference to FIG. 10.

Figure 10:
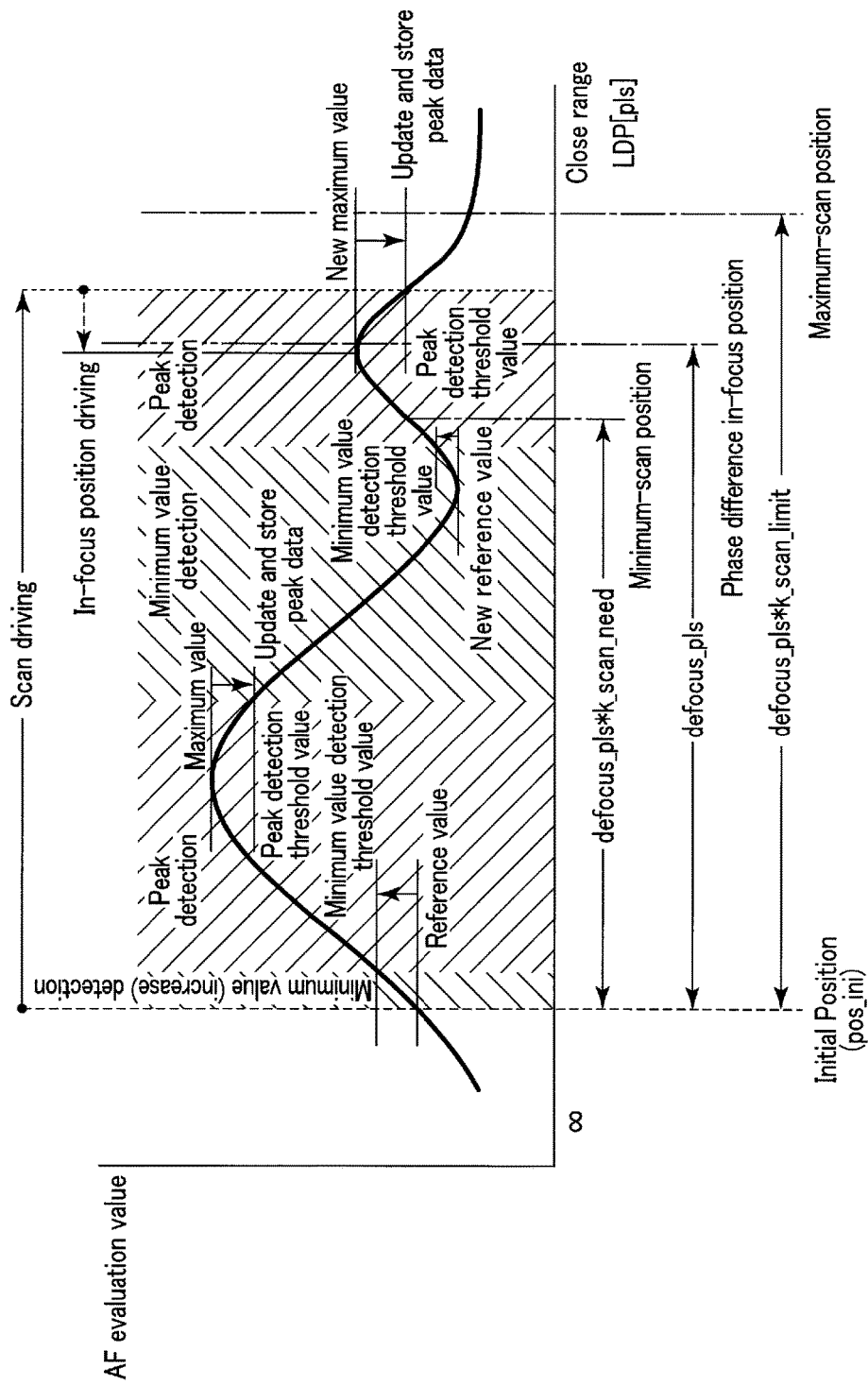
FIG. 10 is a diagram illustrating an AF operation when the scan driving starts in an upward direction of a contrast curve and there are a plurality of peaks (maximum values).

Assume that the initial position pos_ini that is a position of the focus lens when the camera CPU 28 determines in step SB that the first release input has been provided, corresponds to the position as illustrated in FIG. 10 and also assume that the camera CPU 28 determines in step SC2 that the defocus amount calculated in step SC1 of the defocus amount acquisition subroutine of step SC is reliable. On this assumption, "valid" is set in the "defocus amount" flag in step SC4. In the subsequent steps SC5 through SC7, the pulse amount defocus_pls corresponding to the defocus amount is acquired, and the minimum-scan pulse amount scan_need_pls and the maximum-scan pulse amount scan_limit_pls are calculated.

In step SD, the camera CPU 28 performs an exposure setting for contrast AF. In step SE, the camera CPU 28 performs an initial position driving. Then, the camera CPU 28 performs a scan driving start subroutine in step SF. In the scan driving start subroutine, the camera CPU 28 determines in step SF1 that "valid" is set in the "defocus" flag. Accordingly, the scan driving of the focus lens is started in the defocus direction in step SF2.

In the direction determination subroutine in step SG, the camera CPU 28 determines in step SG1 that "valid" is set in the "defocus" flag. Accordingly, the camera CPU 28 sets "forward direction" in the "direction" flag in step SG2 and sets "minimum value detecting" in the "status" flag in step SG3.

In the peak detection subroutine in step SH, therefore, the camera CPU 28 acquires the current AF evaluation value AFval_Now in step SH1 and then determines that "minimum value detecting" in the "status" flag in step SH2. The camera CPU 28 thus performs the minimum value detecting process subroutine in step SH3.

In the example shown in FIG. 10, the direction of scan driving started from the initial position pos_ini is the upward-direction of the contrast curve. In step SH31 of the minimum value detecting process subroutine, therefore, the camera CPU 28 determines that the current AF evaluation value AFval_Now does not decrease from the last AF evaluation value AFval_Before. Accordingly, the camera CPU 28 calculates a rate of increase in step SH34. Then, the camera CPU 28 determines that the AF evaluation value does not increase in step SH35. Accordingly, the camera CPU 28 sets "unsatisfied" in the "minimum value detecting condition" flag in step SH33. Therefore, after the camera CPU 28 ends the minimum value detecting process subroutine, it returns the process to step SH1 through steps SH5 and SH6 and repeats the processing loop of steps SH1 through SH6. As the scan driving advances, the AF evaluation value increases. In step SH35, the camera CPU 28 thus determines that the AF evaluation value increases. In step SH36, the camera CPU 28 sets "satisfied" in the "minimum value detecting condition" flag as having detected the minimum value. In step SH4, the camera CPU 28 determines that "satisfied" is set in the "minimum value detecting condition" flag. In step SH7, the camera CPU 28 sets "peak detecting" in the "status" flag.

As described above, in the example of FIG. 10, the direction of scan driving started from the initial position pos_ini is the upward-direction of the contrast curve. In the minimum value detecting process subroutine in step SH3, the camera CPU 28 does not detect the minimum value but detects only that the AF evaluation value increases. Therefore, the minimum value detecting process subroutine can be read as an increase detection subroutine.

After the camera CPU 28 sets "peak detecting" in the "status" flag in step SH7, it determines that "valid" is set in the "defocus amount" flag in step SH81 in the scan completion determination subroutine in step SH8. Accordingly, in step SH82, the camera CPU 28 chooses a combination of the conditions [1] through [5] as scan completion condition. In step SH84, the camera CPU 28 determines whether the scan completion condition is satisfied. In this case, none of the conditions [1] through [5] is satisfied; thus, the camera CPU 28 sets "False" in the "scan completion condition" flag in step SH86. After the camera CPU 28 ends the scan completion determination subroutine, it returns the process to step SH1 through steps SH9 and SH6 and advances to step SH2. In step SH2, the camera CPU 28 determines that "minimum detecting" is not set in the "status" flag; thus, it performs the peak detecting process subroutine of step SH10. The minimum value (increase) detection process is switched to the peak detecting process.

In the peak detecting process subroutine, the camera CPU 28 determines in step SH101 that the current AF evaluation value AFval_Now is larger than the AF evaluation value maximum value AFval_Max. Accordingly, in step SH102, the AF evaluation value maximum value AFval_Max is updated by the current AF evaluation value AFval_Now. After the camera CPU 28 ends the peak detecting process subroutine, it returns the process to step SH1 through steps SH11, SH8, SH9 and SH6. Thus, a processing loop of steps SH1, SH2, SH10, SH11, SH8, SH9 and SH6 is repeated. As the scan driving advances, the AF evaluation value increases, exceeds the peak and then decreases. Thus, the camera CPU 28 determines that the current AF evaluation value AFval_Now is not larger than the AF evaluation value maximum value AFval_Max in step SH101 in the peak detecting process subroutine of step SH10. In this case, a rate of decrease is calculated in step SH103. After that, in step SH104, the camera CPU 28 determines that the rate of decrease is smaller than the peak detection threshold value. In step SH106, the camera CPU 28 sets "unsatisfied" in the "peak detection condition" flag. Thus, even after the camera CPU 28 ends the peak detecting process subroutine, it returns the process to step SH1 through steps SH11, SH8, SH9 and SH6, and repeats the processing loop of steps SH1, SH2, SH10, SH11, SH8, SH9 and SH6.

As the scan driving advances, the AF evaluation value decreases further. Accordingly, the camera CPU 28 determines in step SH104 that the rate of decrease is equal to or higher than the peak detection threshold value. In step SH105, the camera CPU 28 sets "satisfied" in the "peak detection condition" flag. Accordingly, the camera CPU 28 determines that "satisfied" is set in the "peak detection condition" flag in step SH11 after the peak detecting process subroutine is ended. In step SH12, the AF evaluation value maximum value AFval_Max is updated and stored as the finally-detected peak data. After that, the AF evaluation value maximum value AFval_Max is cleared to zero. In step SH14, the camera CPU 28 sets "minimum value detecting" in the "status" flag.

The camera CPU 28 advances to step SH8 to perform the scan completion determination subroutine. In step SH81, the camera CPU 28 determines that "valid" is set in the "defocus amount" flag. In step SH82, the camera CPU 28 chooses the combination of the above conditions [1] through [5] as scan completion condition. In step SH84, the camera CPU 28 determines whether the scan completion condition is satisfied. In this case, the condition [1] is satisfied, but none of the other conditions has been satisfied yet. Therefore, the camera CPU 28 sets "False" in the "scan completion condition" flag in step SH86. When the camera CPU 28 ends the scan completion determination subroutine, it returns the process to step SH1 through steps SH9 and SH6 and then advances it to step SH2. Then, in step SH2, this time, the camera CPU 28 determines that "minimum value detecting" is set in the "status" flag. Accordingly, the camera CPU 28 performs the minimum value detecting process subroutine in step SH3. The peak detecting process is changed to the minimum value detecting process.

In the minimum value detecting process subroutine, this time, the AF evaluation value decreases. In step SH31, the camera CPU 28 determines that the current AF evaluation value AFval_Now decreases from the last AF evaluation value AFval_Before. The camera CPU 28 advances to step SH32 to update the reference AF evaluation value AFval_Base by the current AF evaluation value AFval_Now. In step SH33, the camera CPU 28 sets "unsatisfied" in the "minimum value detecting condition" flag. In step SH4, the camera CPU 28 determines that "satisfied" is not set in the "minimum value detecting condition" flag. In step SH5, the camera CPU 28 sets "minimum value detecting" in the "status" flag. The camera CPU 28 returns the process to step SH1 through step SH6. Thus, the camera CPU 28 repeats the processing loop of steps SH1 through SH6 to update the reference AF evaluation value AFval_Base.

As the scan driving advances, the AF evaluation value decreases, exceeds the minimum value and then increases. Thus, the camera CPU 28 determines that the current AF evaluation value AFval_Now does not decrease from the last AF evaluation value AFval_Before in step SH31 in the minimum value detecting process subroutine of step SH3. In this case, a rate of increase is calculated in step SH34. After that, in step SH35, the camera CPU 28 determines that the AF evaluation value does not increase. In step SH33, the camera CPU 28 sets "unsatisfied" in the "minimum value detecting condition" flag. Thus, after the camera CPU 28 ends the minimum value detecting process subroutine, it returns the process to step SH1 through steps SH5 and SH6, and repeats the processing loop of steps SH1 through SH6. As the scan driving advances and thus the AF evaluation value increases, the camera CPU 28 determines in step SH35 that the AF evaluation value increases. In step SH36, the camera CPU 28 sets "satisfied" in the "minimum value detecting condition" flag. In step SH4, the camera CPU 28 determines that "satisfied" is set in the "minimum value detecting condition" flag. In step SH7, the camera CPU 28 sets "peak detecting" in the "status" flag.

The camera CPU 28 repeatedly performs the scan completion determination subroutine of step SH8 and the peak detecting process subroutine of SH10 as described above.

If the camera CPU 28 performs the scan completion determination and the peak detection while performing the scan driving, the focus lens reaches the minimum-scan position. In this case, the condition [2] as well as the condition [1] is satisfied when the camera CPU 28 determines in step SH84 whether the scan completion condition is satisfied or not in the scan completion determination subroutine of step SH8. However, the condition [2] needs to be satisfied together with condition [3]. In step SH84, therefore, the camera CPU 28 determines that the scan completion condition has not yet been satisfied. The camera CPU 28 thus continues the scan driving.

If the camera CPU 28 further performs the scan completion determination and the peak detection while performing the scan driving, the AF evaluation value exceeds the second peak and then decreases. This is detected by determining that the rate of decrease is equal to or higher than the peak detection threshold value in step SH104 in the peak detecting process subroutine of step SH10. Accordingly, in step SH105, the camera CPU 28 sets "satisfied" in the "peak detection condition" flag. In step SH11 after the peak detecting process subroutine, the camera CPU 28 thus determines that "satisfied" is set in the "peak detection condition" flag. In this case, in step SH12, the AF evaluation value maximum value AFval_Max is updated and stored as finally-detected peak data. After that, the camera CPU 28 advances to step SH14 through step SH13 to set "minimum value detecting" in the "status" flag. The AF evaluation value maximum value AFval_Max, namely, the peak position does not necessarily coincide with the phase difference in-focus position based on the defocus amount.

After "minimum value detecting" is set in the "status" flag, the condition [3] as well as the conditions [1] and [2] is satisfied when the camera CPU 28 determines whether the scan completion condition is satisfied in step SH84 in the scan completion determination subroutine of step SH8. In this case, therefore, the camera CPU 28 determines in step SH84 that the scan completion condition is satisfied. In step SH85, "True" is set in the "scan completion condition" flag. In the subsequent step SH9, the camera CPU 28 determines that "True" is set in the "scan completion condition" flag. In step SH15, the finally-detected peak data is set as adopted peak data for in-focus position calculation, and the scan driving of the focus lens is ended in step SH16.

In the in-focus position calculation subroutine of step SI, the camera CPU 28 calculates an in-focus position based on the finally-detected peak data stored in step SH12, namely, based on the AF evaluation value maximum value AFval_Max that is peak data detected finally in a plurality of peaks to be updated and stored. In the in-focus position driving subroutine of step SJ, the focus lens is driven to the calculated in-focus position.

The minimum-scan position is set as a position precedent to the phase difference in-focus position based on the defocus amount. The camera CPU 28 stops the scan operation if it detects a peak (maximum value) during the scan operation before the focus lens reaches the minimum-scan position and it determines that the AF evaluation value indicative of contrast during the scan operation decreases as the latest change after the focus lens reaches the minimum-scan position. The camera can thus be focused by the requisite minimum lens driving. Even in the case of a plurality of peaks included in the AF evaluation value as shown in FIG. 10, namely, even in the case of conditions of mixed remote and near objects, the camera CPU 28 calculates an in-focus position based on the finally-detected peak data. Therefore, the focus lens can be focused on a nearer object with reliability.

Then, an AF operation in which the scan driving is started in the downward direction of the contrast curve and there are a plurality of peaks (maximum values), will be described with reference to FIG. 11.

Figure 11:
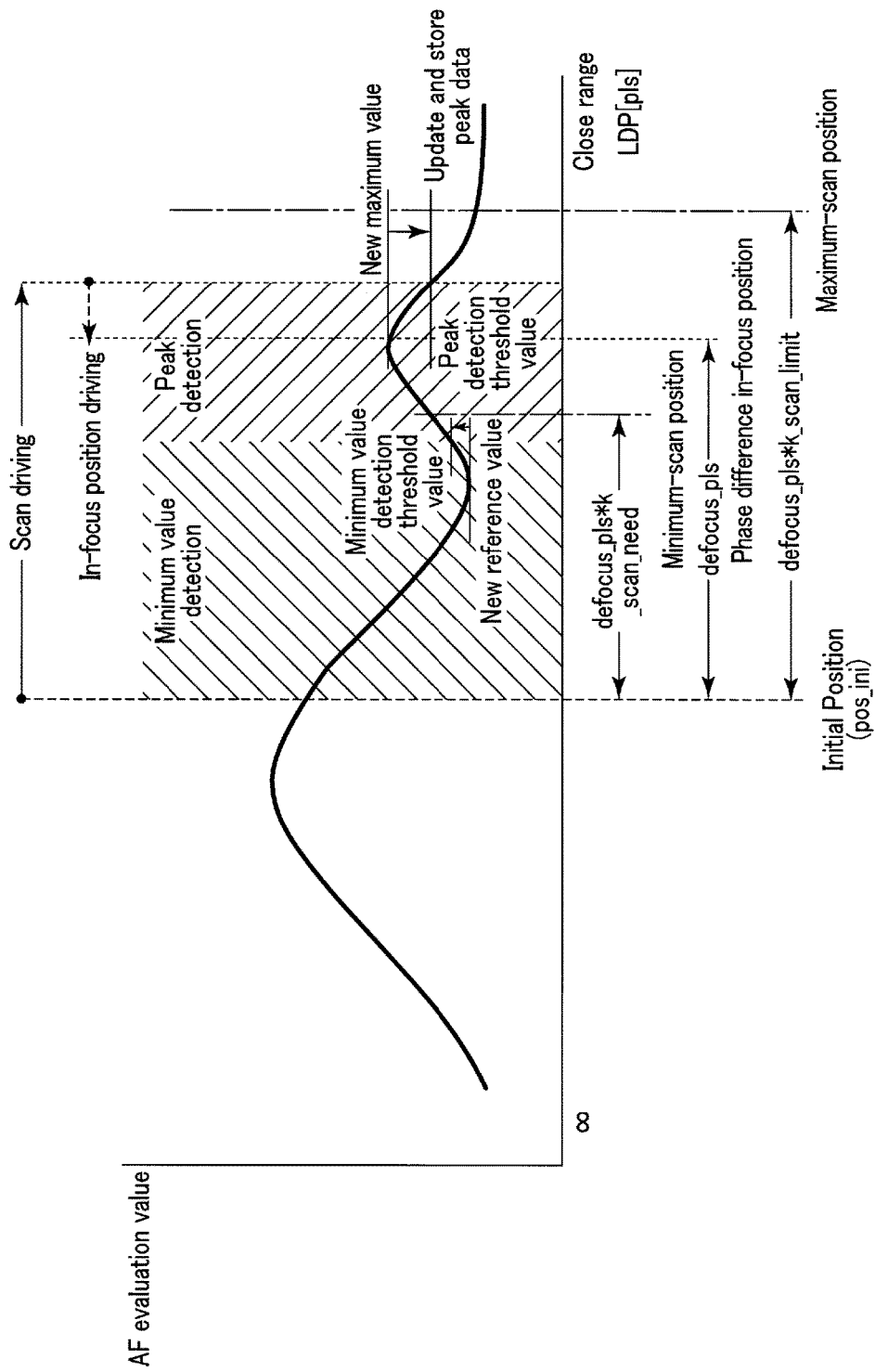
FIG. 11 is a diagram illustrating an AF operation when the scan driving starts in a downward direction of the contrast curve and there are a plurality of peaks (maximum values).

Assume that the initial position pos_ini that is a position of the focus lens when the camera CPU 28 determines in step SB that the first release input has been provided, corresponds to the position as illustrated in FIG. 11 and also assume that the camera CPU 28 determines in step SC2 that the defocus amount calculated in step SC1 of the defocus amount acquisition subroutine of step SC is reliable. On this assumption, as in the case of FIG. 10, a pulse amount defocus_pls corresponding to the defocus amount is acquired, and a minimum-scan pulse amount scan_need_pls and a maximum-scan pulse amount scan_limit_pls are calculated in the defocus amount acquisition subroutine of step SC. The scan driving of the focus lens is started in the defocus direction in step SF through steps SD and SE. In step SG, the camera CPU 28 set "minimum value detecting" in the "status" flag. The camera CPU 28 performs the peak detection subroutine of step SH.

In the peak detection subroutine, "minimum value detecting" is set in the "status" flag. Accordingly, first, the camera CPU 28 performs the minimum value detecting process subroutine of step SH3. Unlike in the example of FIG. 10, in the example of FIG. 11, the direction of the scan driving started from the initial position pos_ini is the downward direction of the contrast curve. Thus, the minimum value detecting process subroutine is not the increase detection subroutine as in the example of FIG. 10.

Then, the camera CPU 28 detects a minimum value in the minimum value detecting process subroutine of step SH3 and sets "satisfied" in the "minimum value detecting condition" flag in step SH36. Accordingly, the camera CPU 28 sets "peak detecting" in the "status" flag in step SH7 and performs the scan completion determination subroutine of step SH8.

In the scan completion determination subroutine, the camera CPU 28 determines in step SH84 whether the scan completion condition is satisfied or not. In this case, the condition [3] is satisfied. Since, however, it is premised that the condition [1] is satisfied, the camera CPU 28 sets "False" in the "scan completion condition" flag in step SH86. When the camera CPU 28 ends the scan completion determination subroutine, it advances through steps SH9, SH6, SH1 and SH2 and repeats the peak detecting process subroutine of step SH10 and the scan completion determination subroutine of step SH8, as described above.

If the camera CPU 28 performs the peak detection and the scan completion determination while performing the scan driving, the focus lens reaches the minimum-scan position. In this case, the condition [3] as well as the condition [2] is satisfied when the camera CPU 28 determines whether the scan completion condition is satisfied or not in step SH84 in the scan completion determination subroutine of step SH8. Since, however, it is premised that the condition [1] is satisfied, the camera CPU 28 determines in step SH84 that the scan completion condition has not yet been satisfied. The camera CPU 28 thus continues the scan driving.

If the camera CPU 28 further performs the peak detection and the scan completion determination while performing the scan driving, the AF evaluation value exceeds the peak and then decreases. This is detected by determining that the rate of decrease is equal to or higher than the peak detection threshold value in step SH104 in the peak detecting process subroutine of step SH10. Accordingly, in step SH105, the camera CPU 28 sets "satisfied" in the "peak detection condition" flag. In step SH11 after the peak detecting process subroutine, the camera CPU 28 thus determines that "satisfied" is set in the "peak detection condition" flag. In this case, in step SH12, the AF evaluation value maximum value AFval_Max is updated and stored as finally-detected peak data. After that, the camera CPU 28 advances to step SH14 through step SH13 to set "minimum value detecting" in the "status" flag. The AF evaluation value maximum value AFval_Max, namely, the peak position does not necessarily coincide with the phase difference in-focus position based on the defocus amount.

After "minimum value detecting" is set in the "status" flag, the condition [1], which is a prerequisite condition, as well as the conditions [2] and [3] is satisfied when the camera CPU 28 determines whether the scan completion condition is satisfied in step SH84 in the scan completion determination subroutine of step SH8. In this case, therefore, the camera CPU 28 determines in step SH84 that the scan completion condition is satisfied. In step SH85, "True" is set in the "scan completion condition" flag. In the subsequent step SH9, the camera CPU 28 determines that "True" is set in the "scan completion condition" flag. In step SH15, therefore, the finally-detected peak data is set as adopted peak data for in-focus position calculation, and the scan driving of the focus lens is ended in step SH16.

In the in-focus position calculation subroutine of step SI, the camera CPU 28 calculates an in-focus position based on the finally-detected peak data stored in step SH12, namely, based on the AF evaluation value maximum value AFval_Max that is peak data detected finally in a plurality of peaks to be updated and stored. In the in-focus position driving subroutine of step SJ, the focus lens is driven to the calculated in-focus position.

Like in the AF operation shown in FIG. 10, in the AF operation in which the scan driving is started in the downward direction of the contrast curve and there are a plurality of peaks (maximum values), the focus lens can be focused by the requisite minimum lens driving. Even in the case of conditions of mixed remote and near objects, the focus lens can be focused on a nearer object with reliability.

Then, an AF operation in which the scan driving is stopped in the minimum-scan position as the determination start position that is a position of the focus lens where the camera CPU 28 starts to determine whether the scan operation should be stopped or not, will be described with reference to FIG. 12.

Figure 12:
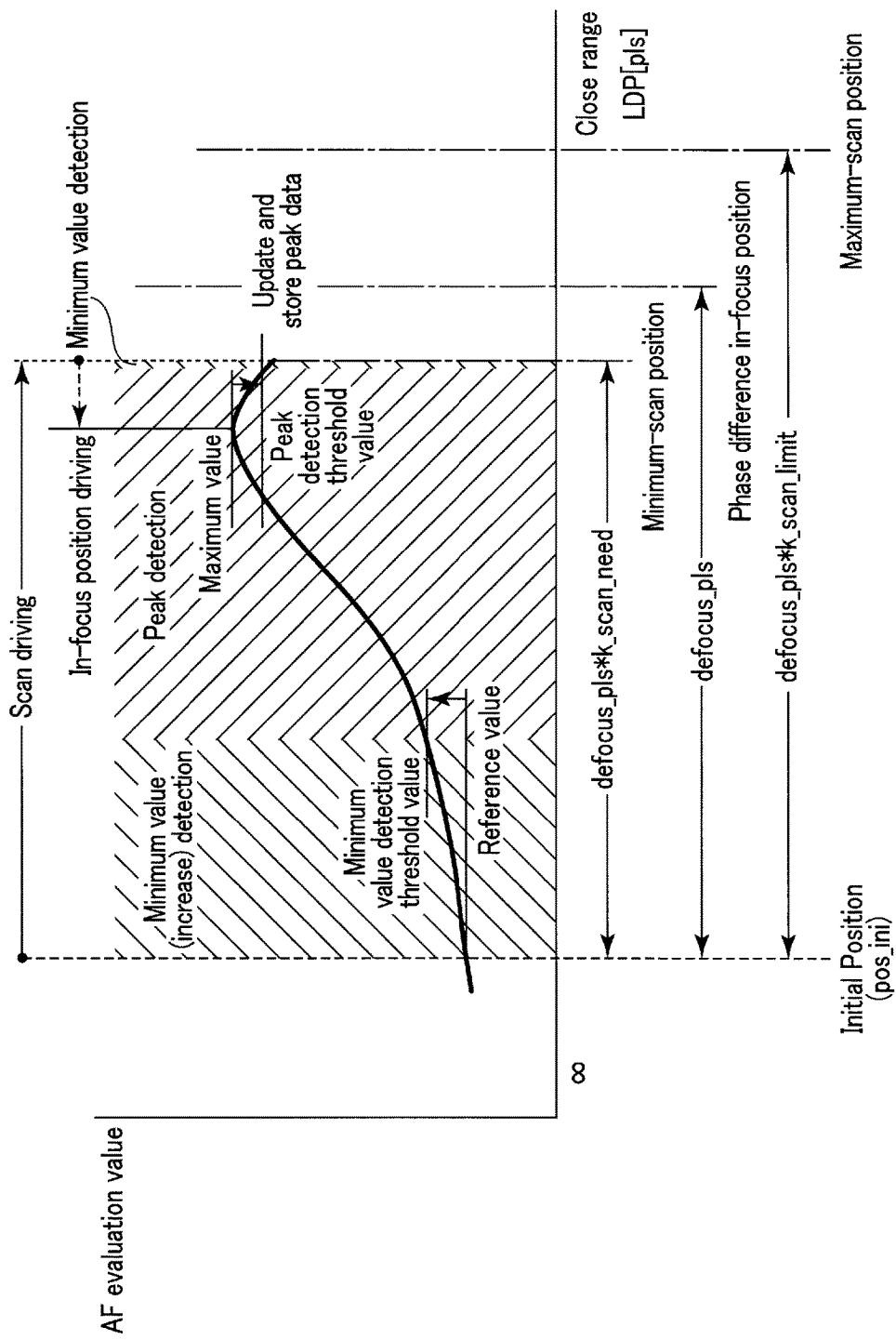
FIG. 12 is a diagram illustrating an AF operation when the scan driving stops at a determination start position.

Assume that the initial position pos_ini that is a position of the focus lens when the camera CPU 28 determines in step SB that the first release input has been provided, corresponds to the position as illustrated in FIG. 12 and also assume that the camera CPU 28 determines in step SC2 that the defocus amount calculated in step SC1 of the defocus amount acquisition subroutine of step SC is reliable. On this assumption, as in the case of FIG. 10, the scan driving is started, the increase detection is performed, and then the peak detection is performed.

In the example of FIG. 12, the camera CPU 28 detects the peak (maximum value) of the AF evaluation value before the defocus lens reaches the minimum-scan position and then goes into a minimum-value detecting state. Assuming that the focus lens, which is performing scan driving, reaches the minimum-scan position before the minimum value is detected, the condition [2] as well as the conditions [1] and [3] is satisfied when the camera CPU 28 determines whether the scan completion condition is satisfied in step SH84 in the scan completion determination subroutine of step SH8. In this case, therefore, the camera CPU 28 determines in step SH84 that the scan completion condition is satisfied. In step SH85, "True" is set in the "scan completion condition" flag. In the subsequent step SH9, the camera CPU 28 determines that "True" is set in the "scan completion condition" flag. In step SH15, therefore, the finally-detected peak data is set as adopted peak data for in-focus position calculation, and the scan driving of the focus lens is ended in step SH16.

In the in-focus position calculation subroutine of step SI, the camera CPU 28 calculates an in-focus position based on the finally-detected peak data stored in step SH12, namely, based on the AF evaluation value maximum value AFval_Max that is peak data detected finally in a plurality of peaks to be updated and stored. In the in-focus position driving subroutine of step SJ, the focus lens is driven to the calculated in-focus position.

The camera CPU 28 sets the minimum-scan position as a position precedent to the phase difference in-focus position based on the defocus amount. The camera CPU 28 stops the scan operation if it detects a peak (maximum value) during the scan operation before the focus lens reaches the minimum-scan position and it determines that the AF evaluation value indicative of contrast during the scan operation decreases as the latest change after the focus lens reaches the minimum-scan position. The focus lens can thus be focused by the requisite minimum lens driving.

As described above, the focus adjustment device in the image pickup apparatus 10 according to the embodiment includes the image pickup device 30 which receives object light via the image-acquiring lens 16 including a focus lens and generates image pickup signals. The focus adjustment device allows a defocus amount to be detected by a phase difference detection system based on the image pickup signals and allows contrast to be detected by a contrast detection system based on the image pickup signals. The focus adjustment device particularly includes the contrast AF evaluation calculation circuit 46 which loads the image pickup signal from the image pickup device 30 and calculates an AF evaluation value indicative of contrast based on the image pickup signals, the phase difference AF defocus amount calculation circuit 48 which loads signals from phase difference pixels of the image pickup device 30 to perform focus detection by phase difference detection and output the defocus amount of the image-acquiring lens 16, and the camera CPU 28 which controls focus adjustment of the focus lens based on outputs of the contrast AF evaluation calculation circuit 46 and the phase difference AF defocus amount calculation circuit 48. The camera CPU 28 functions as an extreme value detection section which acquires the AF evaluation value repeatedly while performing scan driving of the focus lens, based on a direction indicated by the defocus amount detected by the phase difference detection system, and performs a scan operation to detect and store an extreme value of the AF evaluation value and a direction of change in the AF evaluation value, a determination start position calculation section which calculates a minimum-scan position, which is a determination start position corresponding to a position of the focus lens where a determination whether the scan operation is stopped is started, as a position precedent to a phase difference in-focus position that is an in-focus position based on the defocus amount, and a control section which stops the scan operation if the extreme value detection section detects a peak (maximum value) during the scan operation before the focus lens reaches the minimum-scan position and the control section determines that the AF evaluation value decreases as the latest change during the scan operation after the focus lens reaches the minimum-scan position. In the focus adjustment device, therefore, the focus lens can be focused by the requisite minimum lens driving (AF time).

The camera CPU 28 continues the scan operation if it detects a peak during the scan operation before the focus lens reaches the minimum-scan position and determines that the AF evaluation value increases as the latest change during the scan operation. In other words, if the AF evaluation value increases as the latest change even though the focus lens reaches the minimum-scan position, the camera CPU 28 performs a further peak detection. Even in the case of conditions for mixed remote and near objects including a plurality of peaks, the focus lens can be focused on a nearer object with reliability.

When the camera CPU 28 continues the scan operation, it detects a peak of the AF evaluation value and drives the focus lens to a position of the focus lens corresponding to the peak detected during the scan operation. The focus lens can thus be moved to the in-focus position of the nearer object.

When the camera CPU 28 detects a minimum value of the AF evaluation value during the scan operation before the focus lens reaches the minimum-scan position, it continues the scan operation and detects a peak of the AF evaluation value. Even though the focus lens reaches the minimum-scan position, if the camera CPU 28 has already detected a minimum value of the AF evaluation value, it performs a further peak detection. Even in the case of conditions for mixed remote and near objects including a plurality of peaks, the focus lens can be focused on a nearer object with reliability.

After the stopping of the scan operation, the camera CPU 28 drives the focus lens to a position of the focus lens corresponding to the peak detected during the scan operation before the focus lens reaches the minimum-scan position. The focus lens can thus be focused on an object with precision.

When the camera CPU 28 detects a plurality of defocus amounts by the phase difference detection system, it calculates the minimum-scan position based on a defocus amount indicative of a nearer object. Even in the case of conditions for mixed remote and near objects including a plurality of peaks, the focus lens can be focused on a nearer object with reliability.

The focus adjustment method according to the embodiment is a method for performing a focus adjustment operation by causing the image pickup device 30 to receive object light via the image-acquiring lens 16 including a focus lens to generate image pickup signals and detect a defocus amount by a phase difference detection system based on the image pickup signals, and detecting contrast by a contrast detection system based on the image pickup signals. The focus adjustment method performs the focus adjustment operation particularly by acquiring the AF evaluation value repeatedly while performing scan driving of the focus lens, based on a direction indicated by the defocus amount detected by the phase difference detection system, performing a scan operation to detect and store an extreme value of the AF evaluation value and a direction of change in the AF evaluation value (steps SF and SH (steps SH1 and SH10)), calculating a minimum-scan position, which is a determination start position corresponding to a position of the focus lens where a determination whether the scan operation is stopped is started, as a position precedent to a phase difference in-focus position that is an in-focus position based on the defocus amount (step SC (steps SC5 and SC6)), stopping the scan operation if a peak (maximum value) is detected during the scan operation before the focus lens reaches the minimum-scan position and it is determined that the AF evaluation value decreases as the latest change during the scan operation after the focus lens reaches the minimum-scan position (step SH (step SH8)), and driving the focus lens to a position of the focus lens corresponding to the peak detected during the scan operation before the focus lens reaches the minimum-scan position (steps SI and SJ). Therefore, the camera can be focused by the requisite minimum lens driving (AF time).

A non-transitory storage medium according to an embodiment stores computer-readable focus adjustment programs which are executed by the camera CPU 24 that is a computer to perform focus adjustment operation by causing an image pickup device 30 to receive object light via the image-acquiring lens 16 including a focus lens to generate image pickup signals and detect a defocus amount by a phase difference detection system based on the image pickup signals, and detecting contrast by a contrast detection system based on the image pickup signals. The focus adjustment programs cause the camera CPU 24 to acquire the AF evaluation value repeatedly while performing scan driving of the focus lens, based on a direction indicated by the defocus amount detected by the phase difference detection system, perform a scan operation to detect and store an extreme value of the AF evaluation value and a direction of change in the AF evaluation value (steps SF and SH (steps SH1 and SH10)), calculate a minimum-scan position, which is a determination start position corresponding to a position of the focus lens where a determination whether the scan operation is stopped is started, as a position precedent to a phase difference in-focus position that is an in-focus position based on the defocus amount (step SC (steps SC5 and SC6)), stop the scan operation if a peak (maximum value) is detected during the scan operation before the focus lens reaches the minimum-scan position and it is determined that the AF evaluation value decreases as the latest change during the scan operation after the focus lens reaches the minimum-scan position (step SH (step SH8)), and drive the focus lens to a position of the focus lens corresponding to the peak detected during the scan operation before the focus lens reaches the minimum-scan position (steps SI and SJ). Therefore, the camera can be focused by the requisite minimum lens driving (AF time).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

The invention claimed is:

1. A focus adjustment device including an image pickup device which receives object light via an image-acquiring lens including a focus lens and generates image pickup signals, the focus adjustment device allowing a defocus amount to be detected by a phase difference detection system based on the image pickup signals and allowing contrast to be detected by a contrast detection system based on the image pickup signals, the focus adjustment device comprising:
  an extreme value detection section configured to acquire the contrast repeatedly while performing scan driving of the focus lens, based on a direction indicated by the defocus amount detected by the phase difference detection system, and perform a scan operation to detect and store an extreme value of the contrast and a direction of change in the contrast;
  a determination start position calculation section configured to calculate a determination start position corresponding to a position of the focus lens where a determination whether the scan operation is stopped is started, as a position precedent to an in-focus position based on the defocus amount; and
  a control section configured to stop the scan operation if the extreme value detection section detects a maximum value during the scan operation before the focus lens reaches the determination start position calculated by the determination start position calculation section and the control section determines that the contrast decreases as a latest change during the scan operation after the focus lens reaches the determination start position.

2. The device according to claim 1, wherein the control section continues the scan operation if the extreme value detection section detects the maximum value during the scan operation before the focus lens reaches the determination start position and the control section determines that the contrast increases as a latest change during the scan operation.

3. The device according to claim 2, wherein when the control section continues the scan operation, the control section causes the extreme value detection section to detect a maximum value of the contrast and drives the focus lens to a position corresponding to the maximum value detected during the scan operation.

4. The device according to claim 1, wherein the control section continues the scan operation and causes the extreme value detection section to detect a maximum value of the contrast when the control section detects a minimum value of the contrast during the scan operation before the focus lens reaches the determination start position.

5. The device according to claim 1, wherein after the stopping of the scan operation, the control section drives the focus lens to a position corresponding to the maximum value detected during the scan operation before the focus lens reaches the determination start position.

6. The device according to claim 1, wherein when a plurality of defocus amounts are detected by the phase difference detection system, the determination start position calculation section calculates the determination start position based on a defocus amount indicative of a nearer object.

7. A focus adjustment method for performing a focus adjustment operation by causing an image pickup device to receive object light via an image-acquiring lens including a focus lens and generate image pickup signals, detecting a defocus amount by a phase difference detection system based on the image pickup signals, and detecting contrast by a contrast detection system based on the image pickup signals, the method comprising:
  acquiring the contrast repeatedly while performing scan driving of the focus lens, based on a direction indicated by the defocus amount detected by the phase difference detection system, and performing a scan operation to detect and store an extreme value of the contrast and a direction of change in the contrast;
  calculating a determination start position corresponding to a position of the focus lens where a determination whether the scan operation is stopped is started, as a position precedent to an in-focus position based on the defocus amount;
  stopping the scan operation if a maximum value is detected during the scan operation before the focus lens reaches the determination start position and it is determined that the contrast decreases as a latest change during the scan operation after the focus lens reaches the determination start position; and
  driving the focus lens to a position of the focus lens, corresponding to the maximum value detected during the scan operation before the focus lens reaches the determination start position.

8. The method according to claim 7, further comprising: continuing the scan operation if the maximum value is detected during the scan operation before the focus lens reaches the determination start position and it is determined that the contrast increases as a latest change during the scan operation.

9. The method according to claim 8, further comprising detecting a maximum value of the contrast when the scan operation is continued, wherein
  the driving the focus lens includes driving the focus lens to a position of the focus lens, corresponding to the maximum value detected while the scan driving is continued.

10. The method according to claim 7, further comprising: continuing the scan operation to detect a maximum value of the contrast when a minimum value of the contrast is detected during the scan operation before the focus lens reaches the determination start position.

11. The method according to claim 7, wherein
  the calculating a determination start position includes calculating the determination start position based on a defocus amount indicative of a nearer object when a plurality of defocus amounts are detected by the phase difference detection system.

12. A non-transitory storage medium for storing computer-readable focus adjustment programs which are executed by a computer which performs focus adjustment operation by causing an image pickup device to receive object light via an image-acquiring lens including a focus lens and generate image pickup signals, detecting a defocus amount by a phase difference detection system based on the image pickup signals, and detecting contrast by a contrast detection system based on the image pickup signals, when the focus adjust programs are executed by the computer, the focus adjust programs causing the computer to:
- acquire the contrast repeatedly while performing scan driving of the focus lens, based on a direction indicated by the defocus amount detected by the phase difference detection system, and perform a scan operation to detect and store an extreme value of the contrast and a direction of change in the contrast;
- calculate a determination start position corresponding to a position of the focus lens where a determination whether the scan operation is stopped is started, as a position precedent to an in-focus position based on the defocus amount;
- stop the scan operation if a maximum value is detected during the scan operation before the focus lens reaches the determination start position and it is determined that the contrast decreases as a latest change during the scan operation after the focus lens reaches the determination start position; and
- drive the focus lens to a position of the focus lens, corresponding to the maximum value detected during the scan operation before the focus lens reaches the determination start position.

13. The medium according to claim 12, wherein
when the focus adjust programs are executed by the computer, the focus adjust programs further causes the computer to continue the scan operation if the maximum value is detected during the scan operation before the focus lens reaches the determination start position and it is determined that the contrast increases as a latest change during the scan operation.

14. The medium according to claim 13, wherein
when the focus adjust programs are executed by the computer, the focus adjust programs further causes the computer to detect a maximum value of the contrast when the scan operation is continued, and
the driving the focus lens includes driving the focus lens to a position of the focus lens, corresponding to the maximum value detected while the scan driving is continued.

15. The medium according to claim 12, wherein
when the focus adjust programs are executed by the computer, the focus adjust programs further causes the computer to continue the scan operation to detect a maximum value of the contrast when a minimum value of the contrast is detected during the scan operation before the focus lens reaches the determination start position.

16. The medium according to claim 12, wherein
the calculating a determination start position includes calculating the determination start position based on a defocus amount indicative of a nearer object when a plurality of defocus amounts are detected by the phase difference detection system.

* * * * *